United States Patent
Epstein et al.

(10) Patent No.: US 10,462,167 B2
(45) Date of Patent: Oct. 29, 2019

(54) USING DATA SCIENCE TO AID IN DETECTION OF UNAUTHORIZED DISTRIBUTION

(71) Applicant: Synamedia Limited, Middlesex (GB)

(72) Inventors: Steve Epstein, Hashmonaim (IL); Ezra Galili, Modiin (IL)

(73) Assignee: Synamedia Limited, Staines upon Thames, Middlesex (GB)

( * ) Notice: Subject to any disclaimer, the term of this patent is extended or adjusted under 35 U.S.C. 154(b) by 69 days.

(21) Appl. No.: 15/396,835

(22) Filed: Jan. 3, 2017

(65) Prior Publication Data

US 2018/0191757 A1 Jul. 5, 2018

(51) Int. Cl.
*H04L 29/06* (2006.01)
*H04L 12/26* (2006.01)
(Continued)

(52) U.S. Cl.
CPC .......... *H04L 63/1425* (2013.01); *G06F 21/10* (2013.01); *H04L 43/08* (2013.01); *H04L 63/10* (2013.01); *H04L 63/102* (2013.01); *H04L 63/1408* (2013.01); *H04L 67/22* (2013.01); *G06F 2221/2111* (2013.01)

(58) Field of Classification Search
CPC ....... H04L 63/08; H04L 63/10; H04L 63/101; H04L 63/102; H04L 63/1408; H04L 63/1425; H04L 65/4069; G06F 2221/2111
See application file for complete search history.

(56) References Cited

U.S. PATENT DOCUMENTS 7,672,373 B2   3/2010   Toebes et al.
7,958,524 B2*  6/2011   Juneau ................ H04L 63/1408
                                              725/104
(Continued)

FOREIGN PATENT DOCUMENTS

CN   101383981   3/2009
CN   201693881   7/2011

OTHER PUBLICATIONS

DRNGR; How to Capture HDCP-Encrypted HDMI Sources (Vudu, Netflix, Directv, Virgin Media, etc.) Feb. 9, 2013 Can be seen at: http://originaltrilogy.com/topic/How-to-capture-HDCP-encrypted-HDMI-sources-Vudu-Netflix-Directv-Virgin-Media-etc/id/15179.
(Continued)

*Primary Examiner* — Linglan E Edwards
(74) *Attorney, Agent, or Firm* — Merchant & Gould P.C.

(57) ABSTRACT

In one embodiment, a method performed by a system that includes at least one processor, the method comprising: obtaining subscriber data of a plurality of subscribers, wherein said subscriber data comprises at least one of: consumption data relating to subscribed content consumption by said plurality of subscribers, or network data relating to data transmittal via one or more computer networks by the plurality of subscribers; detecting anomalous data by comparing subscriber data of different subscribers in the plurality of subscribers; identifying one or more suspected subscribers out of the plurality of subscribers as being suspected of unauthorized subscribed content distribution, the one of more suspected subscribers being associated with the anomalous data; and providing a respective identity for the one or more suspected subscribers.

17 Claims, 6 Drawing Sheets

(51) Int. Cl.
*G06F 21/10* (2013.01)
*H04L 29/08* (2006.01)

(56) References Cited

U.S. PATENT DOCUMENTS

| | | | | | |
|---|---|---|---|---|---|
| 8,272,066 | B2* | 9/2012 | Pal | ................... | H04H 60/31 |
| | | | | | 726/27 |
| 8,904,419 | B2 | 12/2014 | Vinson et al. | | |
| 9,208,534 | B2 | 12/2015 | Cain et al. | | |
| 9,325,715 | B1* | 4/2016 | Chereshnev | ........ | H04L 63/1433 |
| 9,336,380 | B2* | 5/2016 | Spektor | ................... | H04L 63/08 |
| 9,455,974 | B1* | 9/2016 | Ames | ................... | H04L 63/08 |
| 2005/0091167 | A1 | 4/2005 | Moore et al. | | |
| 2005/0268102 | A1* | 12/2005 | Downey | ................... | H04L 9/32 |
| | | | | | 713/176 |
| 2007/0076872 | A1* | 4/2007 | Juneau | ................ | H04L 63/1408 |
| | | | | | 380/202 |
| 2008/0060026 | A1* | 3/2008 | Cheung | ................... | H04L 41/28 |
| | | | | | 725/81 |
| 2009/0300773 | A1* | 12/2009 | Pal | ................... | H04H 60/31 |
| | | | | | 726/27 |
| 2011/0167440 | A1* | 7/2011 | Greenfield | ............ | H04L 63/102 |
| | | | | | 725/25 |
| 2012/0030764 | A1* | 2/2012 | White | ................ | H04L 63/1408 |
| | | | | | 726/23 |
| 2013/0041955 | A1* | 2/2013 | Chasin | ................ | H04L 63/1425 |
| | | | | | 709/206 |
| 2014/0053233 | A1* | 2/2014 | Jacobs | ................... | H04L 63/20 |
| | | | | | 726/1 |
| 2015/0096041 | A1 | 4/2015 | Bommireddipalli et al. | | |
| 2016/0112448 | A1* | 4/2016 | White | ................ | H04L 63/1408 |
| | | | | | 726/23 |

OTHER PUBLICATIONS

Envisional Ltd. et al.; Background Report on Digital Piracy of Sporting Events [viewed 2016—publ date unknown].

Horner, Stephanie N.; DMCA: Professional Sports Leagues' Answer to Protecting Their Broadcasting Rights Against Illegal Streaming; Marq. Sports L. Rev. 24 (2013): 435.

IBM: Intellectual Property Licensing (2016).

IBM: Media and Entertainment Analytics—Uncover Audience Insights and Personalize their Experiences With Advanced Analytics and Cognitive Solutions (2016).

IBM: i2 Enterprise Insight Analysis (2016).

Masciopinto, M et al ; IPTV Streaming Source Classification, 2012 IEEE International Workshop on Information Forensics and Security (WIFS), Tenerife, 2012, pp. 157-162. doi: 10.1109/WIFS.2012.6412642.

Mintz, Shalom; Automatic Creation of Keyword Lists for Detection of Illegal Content Streaming (Apr. 4, 2016), IP.com No. IPCOM000245744D.

Rafique, M. Zubair et al.: It's Free for a Reason: Exploring the Ecosystem of Free Live Streaming Services, In Proceedings of the 23rd Network and Distributed System Security Symposium (NDSS 2016), pp. 1-15. Internet Society, 2016.

Ramya, K. et al.; Tracing Illegal Redistributors of Streaming Contents Using Traffic Patterns; IJCA, 2011.

Sudler, Hasshi; Effectiveness of Anti-Piracy Technology: Finding Appropriate Solutions for Evolving Online Piracy; Business Horizons 56, No. 2 (2013): 149-157.

Whitehall Media Ltd; IBM Big Data Analytics Software Helps to Identify Piracy and Copyright Infringement (2016).

* cited by examiner

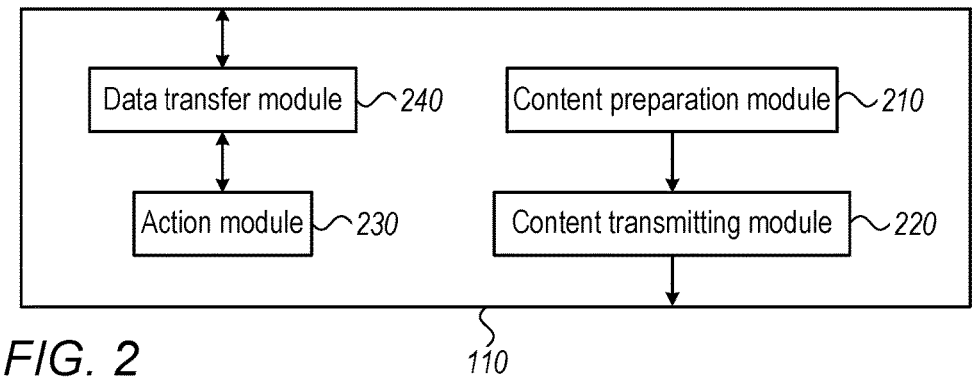
FIG. 2
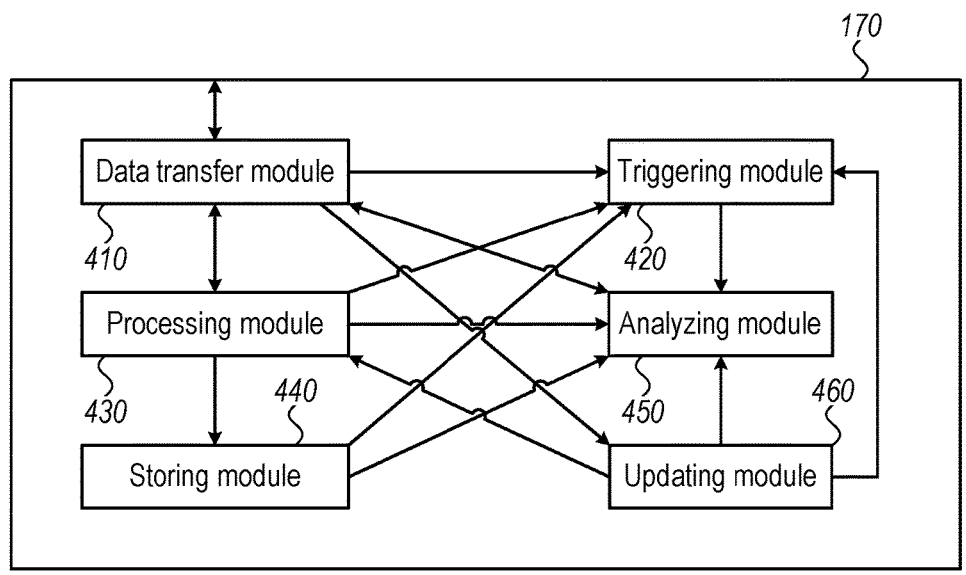
FIG. 3
FIG. 4

USING DATA SCIENCE TO AID IN DETECTION OF UNAUTHORIZED DISTRIBUTION

TECHNICAL FIELD

The present disclosure generally relates to detection of unauthorized distribution of subscribed content.

BACKGROUND

Streaming refers to delivering content over a computer network to a user device of a user, where content received by the user device is presented to the user, even before the entire content is delivered to the user device. Streaming therefore contrasts with downloading, since in downloading the entire content is delivered to the user device before the content is presented to the user.

Streaming web sites may stream content over the Internet and/or over a private network, to one or more user devices. Often the source of particular content streamed by a streaming web site is a subscriber with a subscription to the particular content, and who is therefore authorized to receive the particular content as part of the subscription, but is not authorized to distribute the particular content to others. In such cases, the streaming by the streaming web site of the particular content that was distributed by the subscriber, is also unauthorized.

BRIEF DESCRIPTION OF THE DRAWINGS

The present disclosure will be understood and appreciated more fully from the following detailed description, taken in conjunction with the drawings in which:

FIG. 2 is a functional block diagram of a content provider system, in accordance with some embodiments of the presently disclosed subject matter;

FIG. 3 is a functional block diagram of a policy system, in accordance with some embodiments of the presently disclosed subject matter;

FIG. 4 is a functional block diagram of an identifying system, in accordance with some embodiments of the presently disclosed subject matter;

DESCRIPTION OF EXAMPLE EMBODIMENTS

Overview

There is provided, in accordance with some embodiments of the presently disclosed subject matter, a method performed by a system that includes at least one processor, the method comprising: obtaining subscriber data of a plurality of subscribers, wherein said subscriber data comprises at least one of: consumption data relating to subscribed content consumption by said plurality of subscribers, or network data relating to data transmittal via one or more computer networks by the plurality of subscribers; detecting anomalous data by comparing subscriber data of different subscribers in the plurality of subscribers; identifying one or more suspected subscribers out of the plurality of subscribers as being suspected of unauthorized subscribed content distribution, the one of more suspected subscribers being associated with the anomalous data; and providing a respective identity for the one or more suspected subscribers.

There is further provided, in accordance with some embodiments of the presently disclosed subject matter, a system for providing subscribed content, the system comprising at least one processor, the at least one processor adapted to: perform at least part of one or more actions for at least one of: attempting to confirm unauthorized subscribed content distribution by at least one suspected subscriber, or penalizing the at least one suspected subscriber, the at least one suspected subscriber having been identified out of a plurality of subscribers, as being suspected of unauthorized subscribed content distribution, the at least one suspected subscribers being associated with anomalous data that was detected by comparing subscriber data of different subscribers in the plurality of subscribers, wherein the subscriber data comprises at least one of: consumption data relating to subscribed content consumption by the different subscribers, or network data relating to data transmittal via one or more computer networks by the different subscribers.

Example Embodiments

Figure 1:
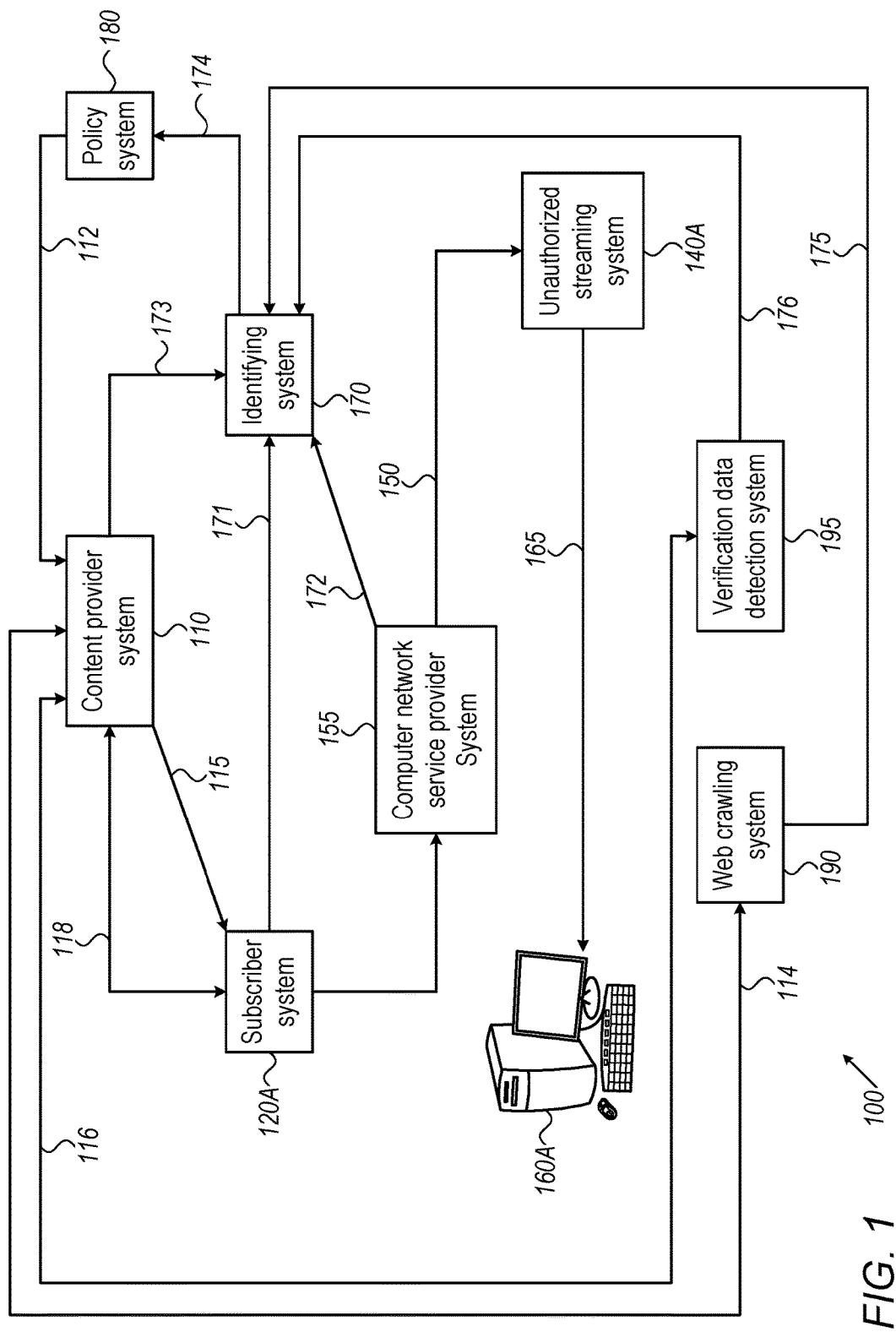
FIG. 1 illustrates a network for detection of unauthorized subscribed content distribution by a subscriber, in accordance with some embodiments of the presently disclosed subject matter.

Reference is now made to FIG. 1 which illustrates a network 100 for detection of unauthorized subscribed content distribution by a subscriber, in accordance with some embodiments of the presently disclosed subject matter.

Network 100 includes the following element(s): one or more identifying systems 170 adapted to identify subscriber(s) suspected of unauthorized distribution of subscribed content ("suspected subscriber(s)"). Network 100 may further include any of the following elements: one or more content provider systems 110; one or more subscriber systems 120 (of which one subscriber system 120A is illustrated); one or more transmission networks 115 adapted to transmit subscribed content from content provider system(s) 110 to subscriber system(s) 120; one or more unauthorized streaming systems 140 (of which one unauthorized streaming system 140A is illustrated) adapted to stream unauthorized content; one or more computer networks 150 by way of which subscriber system(s) 120 may transmit or receive data, including potentially distributing subscribed content to unauthorized streaming system(s) 140; one or more computer network service provider systems 155 (e.g. one or more Internet service provider "ISP" systems) adapted to provide access to computer network(s) 150 by subscriber system(s) 120; and/or one or more user devices 160 (of which one user device 160A is illustrated) adapted to receive unauthorized streamed content via one or more networks 165. Network 100 may further include any of the following elements: one or more policy systems 180 adapted to formulate policy for suspected subscriber(s); one or more web crawling systems 190 adapted to detect web sites associated with unauthorized streaming system(s) 140; and/or one or more verification data detection systems 195 adapted to detect verification data in content streamed by unauthorized streaming system(s) 140.

Network 100 may further include any of the following elements: one or more networks connecting between other element(s) in network 100 and identifying system 170, such as network(s) 171 between subscriber system(s) 120; network(s) 172 between computer network service provider system(s) 155; network(s) 173 between content provider system(s) 110; network(s) 174 between policy system(s) 180; network(s) 175 between web-crawling system(s) 190, and/or network(s) 176 between verification data system(s) 195. Network 100 may further include any of the following elements: one or more networks connecting between other element(s) in network 100 and content provider system 110, such as network(s) 112 between policy system(s) 180, network(s) 114 between web-crawling system(s) 190, network(s) 116 between verification data detection system(s) 195, and/or network(s) 118 between subscriber system(s) 120 for data not transmitted by network(s) 115.

For simplicity of illustration, a single subscriber system 120A, a single streaming system 140A, and a single user device 160A are shown in FIG. 1. Below, when referring to any one particular subscriber system, reference will be made to subscriber system 120A, and when referring to a plurality of subscriber systems, reference will be made to subscriber systems 120. Similarly, when referring to any one particular unauthorized distribution system, reference will be made to unauthorized distribution system 140A, and when referring to a plurality of unauthorized distribution systems, reference will be made to unauthorized distribution systems 140. Similarly, when referring to any one particular user device, reference will be made to user device 160A, and when referring to a plurality of user devices, reference will be made to user devices 160. For each of the other elements of network 100, the element will be referred to in the single form, and the reference should be understood to cover both embodiments where there is a single element of the labeled type, and embodiments where there is a plurality of elements of the labeled type.

Although networks 112, 114, 115, 116, 118, 150, 165, 171, 172, 173, 174, 175 and 176, are labeled with different labels for clarity's sake, in some embodiments one or more of networks 112, 114, 115, 116, 118, 150, 165, 171, 172, 173, 174, 175 and/or 176, may be the same network. In some embodiments, one or more of networks 112, 114, 116, 118, 171, 172, 173, 174, 175, and/or 176, may be omitted from network 100. For example a particular network may be omitted, if there is no transfer between the elements shown connected by the particular network; or for example there is no transfer via the particular network; or for example, if one of the elements shown connected by the particular network is excluded from network 100; or for example if the elements shown connected by the particular network are in a single physical unit and connected to one another within the physical unit.

In some embodiments, network 100 may include more, less and/or different elements than shown in FIG. 1. Each of the elements of network 100 may include appropriate structure to perform the operations attributed to the element herein. However, for the sake of further illustration to the reader, some examples of structure for certain elements will be provided further below. Any of networks 112, 114, 115, 116, 118, 150, 165, 171, 172, 173, 174, 175 and/or 176 may be implemented using any appropriate wired and/or wireless technology. However for the sake of further illustration to the reader, some examples of technology for certain networks will be discussed further below.

Content provider system 110 may provide content to subscriber systems 120, including to subscriber system 120A. Subscriber systems 120 may be associated with subscribers to the subscribed content. A subscriber associated with subscriber system 120A may have a subscription to all or to some of the content provided by content provider system 110, and therefore the subscriber is referred to herein as the "subscriber", and the system of the subscriber is referred to as the "subscriber system". Due to the subscription, the subscriber may be authorized to receive subscribed content from content provider system 110 but may not be authorized by the content provider to distribute subscribed content, e.g. to streaming system 140A (referred to herein as "unauthorized streaming system" because of the lack of authorization). The content provider may be the provider associated with content provider system 110, e.g. the individual, partnership, company or organization that owns, leases, possesses and/or operates content provider system 110. A subscriber associated with subscriber system 120A may be an individual, partnership, company or organization that owns, leases, possesses and/or operates subscriber system 120A.

The terms "content" and "subscribed content" are used herein interchangeably. The term "distribute" herein is used to refer to the provision of subscribed content by the subscriber to at least one destination, and does not require any specific manner of provision, any specific destination, or any specific number of destination(s). The manner of provision (e.g. network, protocol, etc.), the destination(s) and/or the number of destination(s) may vary, and may include any appropriate embodiments. It is noted that the subscriber may not be authorized to distribute subscribed content, even if the subscribed content that is distributed is not identical to the subscribed content received from content provider system 110. For example, the distributed content may differ from the received content by including embedded verification data that is embedded by subscriber system 120A, by being degraded in quality, by being filtered from commercials, etc. Regardless of whether or not the distributed content is identical to the received content, the distribution by the subscriber may not be authorized by the content provider and therefore the description will term both identical and non-identical content distribution as unauthorized subscribed content distribution.

Content provider system 110 may be any appropriate system adapted to provide content to subscriber systems 120 of subscribers, and therefore the type of content provider system 110 may vary depending on the embodiment. In some examples, content provider system 110 may be a broadcast over-the-top content (OTT) system.

For instance, content provided by content provider system 110 may include, e.g. visual data, audio data, and/or meta data. The content may undergo processing such as MPEG compression, encryption, multiplexing, etc. For example such processing may add conditional access data/digital rights management data, forward error correction data, etc. Verification data, which will be described in more detail below may in some cases be included in the content before the processing or may be added by the processing. Overlay data, which will also be described in more detail below, may in some cases be included in the content before processing or may be added by the processing. The various possible transmission means for the content, e.g. satellite transmission, terrestrial transmission, cable, and/or computer network, are referred to, for simplicity's sake, as transmission network 115.

In order to perform the above described functions, content provider system 110 may comprise dedicated hardware logic circuits, in the form of an application-specific integrated circuit (ASIC), field programmable gate array (FPGA), or full-custom integrated circuit, or a combination of such devices. Alternatively or additionally, some or all of the functions of content provider system 110 may be carried out by at least one programmable processor, such as a microprocessor or digital signal processor (DSP), under the control of suitable software, or in other words computer readable program code. The software may be included on a computer readable medium. For example, this software may be downloaded to the processor(s) in electronic form, over a network. Alternatively or additionally, the software may be stored on a storage medium, such as an optical, magnetic, or electronic memory medium. Such processor(s) may additionally or alternatively carry out action(s), at least in part, included in policy/ies regarding subscriber(s) suspected of unauthorized distribution of subscribed content (or equivalently "unauthorized subscribed content distribution"), as will be described in more detail below.

FIG. 2 is a functional block diagram of content provider system 110, in accordance with some embodiments of the presently disclosed subject matter. In the functional block diagram, content provider system 110 may include a content preparation module 210 for preparing the content (e.g. including compression, encrypting, multiplexing, etc.). Content provider system 110 may include a content transmitting module 220 for transmitting the content and possibly other accompanying data (such as verification data and/or overlay data) to subscriber systems 120. Content provider system 110 may include an action module 230 for performing, at least in part, actions specified in policies. Content provider system may include a data transfer module 240 to transfer data (other than content or data accompanying the content) to and/or from elements in network 100. Such data may include, for example, consumption data transferred from subscriber systems 120 and/or transferred to identifying system 170; feedback to identifying system 170; policies from policy system 180; directions to and/or feedback from web-crawling system 190; directions to and/or feedback from verification data detection system 195; warnings to subscriber systems 120; etc.

Subscriber system 120A may be any appropriate system adapted to receive subscribed content provided by content provider system 110 for the subscriber associated with subscriber system 120A, and adapted to distribute subscribed content to one or more unauthorized streaming systems 140. Therefore, subscriber system 120A may vary depending on the embodiment. For example, subscriber system 120A may include any appropriate module or combination of modules associated with a subscriber that may be adapted to receive subscribed content provided by content provider system 110 and may be adapted to distribute subscribed content to one or more unauthorized streaming systems 140.

Subscriber system 120A may include, for instance, one or more of any of the following modules: set top box (STB), tablet device, smartphone, desktop or portable computer, Internet-enabled television, media center PC, router, antenna, television, smart television, frame grabber, video capture card, high definition multi-media interface (HDMI) port, analog port, network interface, subscription smartcard, etc. The smart card, if included, may for instance, store secret(s) used for decryption, and a zip code associated with the subscriber. A set top box, if included, may for instance have an interface to verify that the smartcard is cryptographically paired to the set top box.

Receiving of subscribed content by subscriber system 120A via certain type(s) of transmission network 115 may include analog to digital demodulation at subscriber system 120A, e.g. if the signal was transmitted from a satellite or terrestrial transmitter and received by an antenna/dish included in subscriber system 120A. Receiving by subscriber system 120A of the content provided by content provider system 110, via transmission network 115, may include decoding, decryption, demultiplexing, etc. The content, or the part of the content to be presented to the subscriber, may then be suitable for presentation to the subscriber. If verification data (e.g. verification command(s)) was added by content provider system 110 in order to command subscriber system 120A to generate verification data (e.g. watermark, fingerprint, message, etc.), and accompanies the received content, then subscriber system 120A may be adapted to generate such verification data and embed the generated verification data in the content that will be presented to the subscriber. The embedded verification data may be presented to or hidden from the subscriber. If verification data (e.g. watermark, fingerprint, message, etc.) was embedded in the content by content provider system 110, then the embedded verification data may be presented to or hidden from the subscriber when the content is presented. It will be understood that in some embodiments, verification data may not be provided by content provider system 110. Similarly, if overlay data (e.g. overlay command(s)) was added by content provider system 110 in order to command subscriber system 120A to generate overlay data, and accompanies the received content, then subscriber system 120A may be adapted to generate such overlay data and overlay the overlaid data on the content that will be presented to the subscriber. If overlay data was overlaid on the content by content provider system 110, then the overlaid data may be presented to the subscriber when the content is presented. Overlaid data on the content may reduce the enjoyment of the viewer of the content. It will be understood that in some embodiments, overlay data may not be provided by content provider system 110.

Subscriber system 120A may be adapted to distribute content to unauthorized content streaming system 140A, for example by transmitting content via computer network 150. In this example, the content may be transmitted by subscriber system 120A to streaming system 140A in any appropriate manner which may vary depending on the embodiment, such as by uploading the content.

In order to perform the above described functions, subscriber system 120A may comprise dedicated hardware logic circuits, in the form of an application-specific integrated circuit (ASIC), field programmable gate array (FPGA), or full-custom integrated circuit, or a combination of such devices. Alternatively or additionally, some or all of the functions of subscriber system 120A may be carried out by at least one programmable processor, such as a microprocessor or digital signal processor (DSP), under the control of suitable software. The software may be included on a computer readable medium. For example, this software may be downloaded to the processor(s) in electronic form, over a network. Alternatively or additionally, the software may be stored on a storage medium, such as an optical, magnetic, or electronic memory medium.

Content provider system 110, subscriber system 120A and/or computer network service provider system 155 may be adapted to send data to identifying system 170, e.g. via network 173, 171 and/or 172, respectively. Such data may comprise data relating to consumption of subscribed content by the subscriber associated with subscriber system 120A, data relating to data transmittal by the subscriber via computer network 150, and/or other data. For example, content provider system 110, subscriber system 120A, and/or computer network service provider 155 include processor(s) under the control of suitable software to send data to identifying system 170. Depending on the embodiment, data may be pulled and/or pushed. The processor(s) may select which data to send and/or send all available data. The processor(s) may schedule the sending of the data; and/or the processor(s) may send data when the data is pulled and/or when the data becomes available.

Unauthorized content streaming system 140A may be adapted to stream content, e.g. distributed by subscriber system 120A, to user device 160A associated with a user. User device 160A may be adapted for example, to receive the streamed data via network 165. Network 165 may be a private network, whereby user device 160A may receive streamed content for a fee; may be a private network whereby user device 160A may receive streamed data for free; may be a public network whereby user device 160A may receive streamed content for a fee; or may be a public network whereby user device 160A may receive streamed content for free. Unauthorized content streaming system 140A, for instance, may be associated with a web site, and user devices 160 that have a browser may access the web site in order to access the streamed content.

In some embodiments, subscriber system 120A may be adapted to perform unauthorized distribution of live subscribed content, meaning that the content is streamed by unauthorized streaming system 140A, at substantially the same time, or with an acceptable delay from the time that the (identical or non-identical) content is provided by content provider system 110 to subscriber system 120A. Herein, the subscriber is similarly referred to as performing unauthorized distribution of live subscribed content in this case. A delay may be caused, for example, by transmission/receiving and processing performed by the various elements in network 100 such as at system 110, system 120A, system 140A, system 155, device 160A, network 115, network 150, and/or network 165. A delay may be deliberately caused and/or may be unintentionally caused. In some cases, a delay may be considered acceptable as long as the delay does not exceed the length of the content (meaning as long as the streaming of the beginning of the content by unauthorized streaming system 140A starts prior to the provision of the end of the content by content provider system 110). In some other embodiments, subscriber system 120A may additionally or alternatively be adapted to provide distribution of content that is not live, in which case delay may be irrelevant.

Web-crawling system 190 may be adapted to web-crawl and to send result(s) of web-crawling to content provider system 110 and/or to identifying system 170. Web-crawling is a term used in the art for systematically browsing the world wide web. With reference to system 100, web-crawling may search the world wide web (e.g. including network 165) for web sites associated with unauthorized subscribed content streaming, meaning associated with unauthorized streaming systems 140. Web-crawling system 190 includes processor(s) under the control of suitable software to web-crawl and to send the result(s) of the web-crawling. In some cases, the web-crawling and/or sending of results may be performed when directed by content provider system 110. Results may include, for instance, IP addresses of unauthorized streaming systems 140, channels being streamed, quality (e.g. quality degradation) of content being streamed, indication of shut down/non shut down of unauthorized streaming system 140A, etc.

Verification data detection system 195 may be adapted to detect and extract verification data from a stream (e.g. streamed content being streamed by unauthorized streaming system 140A in FIG. 1). Verification data detection system 195 may be further adapted to determine the verification data and send an indication of the verification data to content provider system 110 and/or identifying system 170. Verification data detection system 195 includes processor(s) under the control of suitable software to perform such operations. In some cases, such operations may be performed when directed by content provider system 110.

Policy system 180 may be adapted to formulate policies regarding subscribers identified as being suspected of unauthorized distribution of subscribed content. A particular policy may include an enforcement policy, designed to penalize a subscriber identified as being suspected of unauthorized distribution of subscribed content. Additionally or alternatively a particular policy may include a confirmation policy, designed to attempt to confirm that the subscriber is performing unauthorized distribution of subscribed content. Some or all of the functions of policy system 180 may be carried out by at least one programmable processor, such as a microprocessor or digital signal processor (DSP), under the control of suitable software. The software may be included on a computer readable medium. For example, this software may be downloaded to the processor(s) in electronic form, over a network. Alternatively or additionally, the software may be stored on a storage medium, such as an optical, magnetic, or electronic memory medium.

FIG. 3 is a functional block diagram of policy system 180, in accordance with some embodiments of the presently disclosed subject matter. In the functional block diagram, policy system 180 may include a data transfer module 310 for transferring data to and/or from elements in network 100. For example, data may be provided by identifying system 170 to policy system 180; and policy system may provide data (e.g. policies) to content provider system 110, identifying system 170 and/or other element(s) in network 100. Policy system 180 may include a policy formulating module 320 for formulating policies.

Identifying system 170 may be adapted to identify subscribers suspected of unauthorized distribution of subscribed content. Some or all of the functions of identifying system 180 may be carried out by at least one programmable processor, such as a microprocessor or digital signal processor (DSP), under the control of suitable software. The software may be included on a computer readable medium. For example, this software may be downloaded to the processor(s) in electronic form, over a network. Alternatively or additionally, the software may be stored on a storage medium, such as an optical, magnetic, or electronic memory medium.

FIG. 4 is a functional block diagram of identifying system 170, in accordance with some embodiments of the presently disclosed subject matter. In the functional block diagram, identifying system 170 may include a data transfer module 410 for transferring data to and/or from elements in network 100. For example, identifying system 170 may be provided with data from content provider system 110 (e.g. consumption data, etc.), may be provided with data (e.g. consumption data, network data, etc.) from subscriber systems 120, may be provided with data (e.g. network data, etc.) from computer network service provider 155, may be provided with data from web crawling system 190, may be provided with data from policy system 180, and/or may be provided with data from verification data detection system 195. Such data may be transferred, as appropriate to one or more of the other module(s) in identifying system 170 such as a processing module 430, a triggering module 420, an analyzing module 450, and/or an updating 460. Data may be provided by identifying system 170 (e.g. from analyzing module 450 via data transfer module 410) to policy system 180. Data may be transferred (e.g. via data transfer module 410) by identifying system 170 between external databases and analyzing module 450 and/or between external databases and processing module 430. Identifying system 170 may include a triggering module 420 for detecting triggers to analyze data. Identifying system 170 may include a processing module 430 to process transferred data. Identifying system 170 may include a storing module 440 to store data. Identifying system 170 may include an analyzing module 450 to analyze data, e.g., that was received, processed and/or stored, to identify subscribers suspected of unauthorized subscribed content distribution based on the analysis, and to enable policy formulation for such subscribers. Identifying system 170 may include an updating module 460 to update processing and/or analyzing technique(s). The updating by updating module 460 may in some cases affect the performance of triggering module 420, analyzing module 450, and/or processing module 430. The receipt, processing, and/or storage of data may in some cases affect the performance of triggering module 420.

Although content provider system 110, computer network service provider system 155, identifying system 170, policy system 180, web crawling system 190 and verification data detection system 195 are illustrated as separate units in FIG. 1, in some embodiments any two or more of systems 110, 155, 170, 180, 190, and/or 195 may be co-located. Depending on the embodiment, co-located systems may be separate systems or may form an integrated system. Additionally or alternatively, depending on the embodiment, modules of any system (e.g. system 110, 155, 170, 180, 190 or 195) may be concentrated in one location (e.g. forming an integrated system or as separate modules), or may be dispersed over more than one location. For example, in some embodiments, content provider system 110 and computer network service provider system 155 may be included together in an integrated system (optionally with other elements shown in FIG. 1) which provides content and network access to subscriber system 120A. As another example, in some embodiments, identifying system 170 and policy system 180 may be included together in an integrated system (optionally with other elements shown in FIG. 1) which both identifies suspected subscribers and formulates policies for the suspected subscribers. In embodiments where a particular system is part of an integrated system, reference to the particular system herein may be understood to refer to the part of the integrated system that performs the function(s) of the particular system. A system in accordance with some embodiments, may therefore include one or more of systems 110, 155, 170, 180, 190 and/or 195.

The location(s) of content provider system 110, computer network service provider system 155, identifying system 170, policy system 180, web crawling system 190, and verification data detection system 195 may vary depending on the embodiment and may include any appropriate location(s). In some embodiments, software, platform or infrastructure for any of content provider system 110, computer network service provider system 155, identifying system 170, policy system 180, web crawling system 190, verification data detection system 195, and/or any part thereof may be provided by cloud provider(s) in accordance with the corresponding software as a service, platform as a service, or infrastructure as a service cloud computing service model. For example, in some cases identifying system 170 and policy system 180 may be located in public cloud(s), whereas content provider system 110 and computer network service provider system 155 may be located in private cloud(s).

Figure 5:
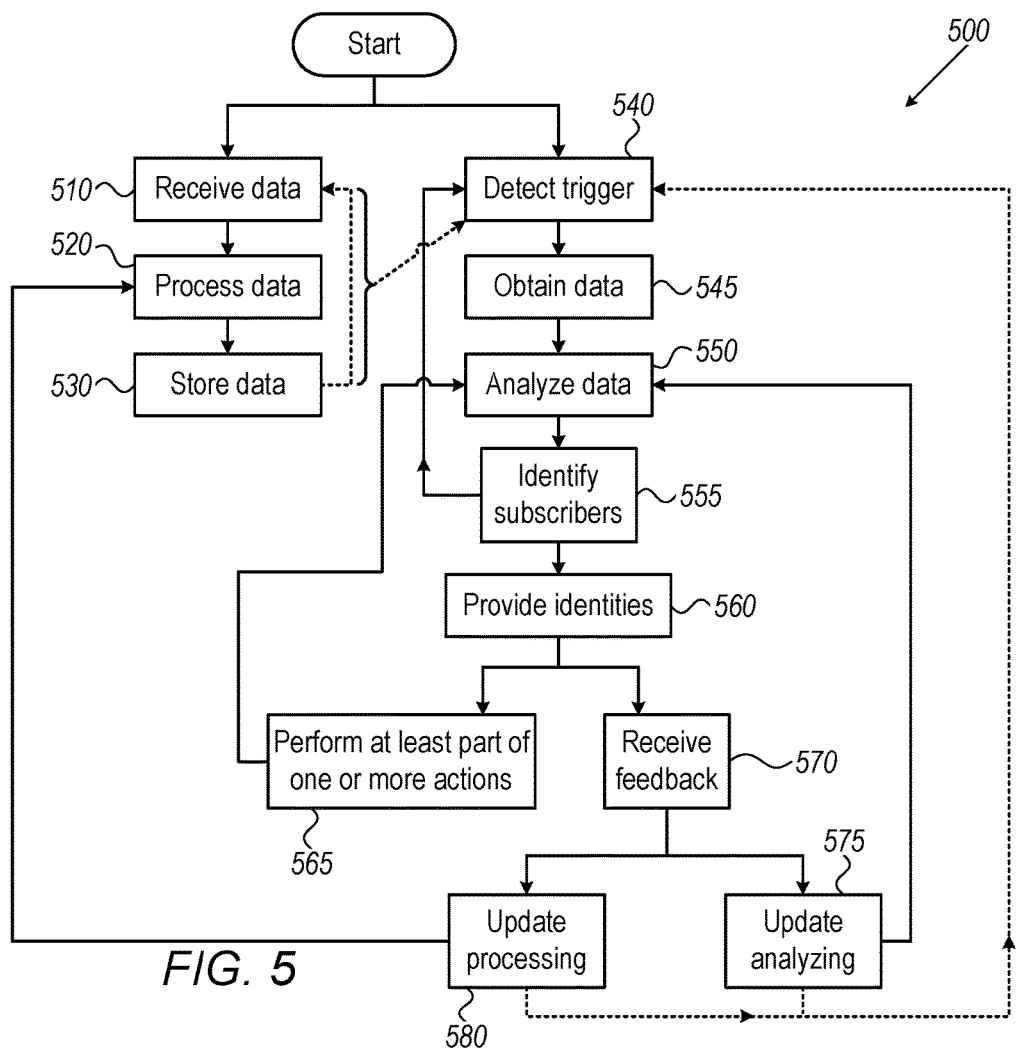
FIG. 5 is a flowchart of a method performed by an identifying system, in accordance with some embodiments of the presently disclosed subject matter.

FIG. 5 is a flowchart of a method 500 performed by identifying system 170, in accordance with some embodiments of the presently disclosed subject matter. Method 500 is described, for simplicity's sake, with the assumption that identifying system 170 is not integrated with any of the other elements in network 100. However, in some embodiments, content provider system 110 may be integrated with one or more other element(s) in network 100, and a similar method may be performed, mutatis mutandis For simplicity's sake, method 500 will be described with reference to subscribers to a particular content provider system 110. However, it should be evident that depending on the embodiment, identifying system 170 may perform method 500 for more than one content provider system 110, in order to detect unauthorized distribution by subscribers of the more than one content provider system 110.

In stage 510 identifying system 170 may receive data regarding subscribers ("subscriber data"). Subscriber data may be received from one or more other elements of network 100, such as subscriber systems 120, content providing system 110, computer network service provider system 155, web-crawling system 190, verification data detection system 195, etc. Data originating from a particular element in network 100 may be received from the particular element and/or from another element. For instance, certain data originating from subscriber systems 120 may be received from subscriber systems 120, or may be sent to content provider system 110 and received by identifying system 170 from content provider system 110.

The subscriber data that is received may vary depending on the embodiment, and may include any appropriate data. However, for the sake of further illustration some examples are now provided. Subscriber data that is received may include, for example, consumption data (meaning data relating to consumption of subscribed content by subscribers). Subscribed consumption data may also be referred to as consumption data, tuning details or tuning data. Consumption data, may include, for instance, any of the following: channel identifier, program identifier, start time, end time, trick mode(s) (if any), raising electronic program guide, subtitles, etc. Such data may be data measured, for instance, by audience measurement systems.

Subscriber data that is received, may additionally or alternatively include network data (meaning data relating to data transmittal via one or more computer networks by subscribers). Such network data may include, for instance, any of the following: start time of transmittal, end time of transmittal, packet characteristics, number of packets, time between packets, number of packets per second, bandwidth (also referred to as traffic), bandwidth increase, bandwidth decrease, transmittal protocols, destination IP addresses, source IP addresses, ports, etc.

Subscriber data that is received may additionally or alternatively include data indicative of characteristics of subscribers. For instance, such indicative data may include any of the following: information on the types of ports in set top boxes included in subscriber systems 120 of subscribers (e.g. analog, HDMI, etc.), zip codes in smartcards, modules included in the subscriber systems 120 of subscribers, types of subscriber systems 120, conditional access data for subscribers, digital rights management data for subscribers, billing addresses of subscribers, etc.

Subscriber data that is received may additionally or alternatively include data regarding available subscribed content. For instance, data regarding available subscribed content may include any of the following: program guides, data regarding commercial interruptions, data regarding body of programs, etc.

Subscriber data that is received may additionally or alternatively relate to detected unauthorized distribution. For instance, such data may include any of the following: IP addresses of detected unauthorized streaming systems 140, channels detected as being streamed by unauthorized streaming systems 140, quality (e.g. quality degradation) of content detected as being streamed without authorization, identification of subscribers suspected of unauthorized subscribed content distribution where the identification was obtained not by way of method 500, etc.

In some embodiments, data that is received may be received episodically by identifying system 170. Additionally or alternatively, in some embodiments, data that is received may be received continuously by identifying system 170 as the data becomes available, is updated and/or is needed by identifying system 170. Data received from other elements of network 100 may be pulled by identifying system 170 and/or pushed to identifying system 170 from other elements of network 100 to identifying system 170. It is noted that not all data may necessarily be received at the same frequency. For example, certain data regarding a subscriber may be received initially when the subscriber becomes a subscriber, and if and when modified (e.g. billing address), whereas other data may be received more frequently.

Depending on the embodiment, received data that relates to the same subscriber may be determined to be relating to the same subscriber in any appropriate manner. For example, received data may be accompanied by the same personal identifier (e.g. phone number, user name, etc.) of a particular subscriber, by the same identifier (e.g. IP address, serial number, etc.) of the subscriber system of the particular subscriber (thereby identifying the subscriber), etc.; and therefore may be determined to be relating to the same subscriber. As another example, received data relating to a particular subscriber may not necessarily be accompanied by the same identifier and may need to be associated with one another so that the processing and analyzing performed by identifying system 170 detects the data as relating to the same subscriber. Continuing with the example, received data from different modules of the subscriber system, may be accompanied by identifiers of the modules, and may be associated based on commonalities (e.g. same billing address, same associated subscriber, same associated subscriber system, etc.) among the modules.

In stage 520, received subscriber data may be processed. For instance, received data may be processed to derive ("enriched") subscriber data that may be used in the analysis, in addition to or instead of received subscriber data. The technique(s) of processing for deriving enriched data from received data may vary depending on the embodiment and may include any appropriate processing technique(s) for deriving enriched data. However, for the sake of further illustration, some instances of processing technique(s) are now provided, one or more of which may be applied in some embodiments.

For instance, the processing may include deriving tuning patterns from the tuning data. Tuning details of subscriber systems 120 may be processed in order to detect tuning patterns. For example, a derived tuning pattern for subscriber system 120A, corresponding to a program identifier or to a time period, may include any of the following: the number of times during the program and/or during the time period that subscriber system 120A tuned in and/or out of the channel, the number of times during the program and/or during the time period that trick mode(s) were used, the number of times during the program and/or during the time period that the electronic program guide was raised, etc. A steady tuning pattern corresponding to a program identifier may include, for example, not changing the channel, not using any trick mode(s), not raising the electronic program guide, etc., during the entire duration (or substantially the entire duration) of the program. Tuning patterns may therefore be an example of enriched consumption data.

For another instance, the processing may include deriving correspondences between consumption and specific content. Tuning details such as channel identifiers and start and end times, program identifiers, etc. may be compared to program(s) included in program guides in order to derive correspondences, such as tuning to a channel during the entire duration of a program on the channel. For example, there may be programs identified in a program guide that it may be especially desirable to protect from unauthorized distribution (e.g. the Super Bowl). The correspondences may therefore be an example of enriched consumption data.

For another instance, the processing may include deriving steady network transmittal patterns, or in another words, steady network transmittal bandwidths. Network data may be processed in order to detect steady network transmittal bandwidths. A steady network transmittal bandwidth may be detected, for instance, when there is little or no increase in bandwidth between the start of the transmittal and the end of the transmittal. Steady network transmittal patterns may therefore be an example of enriched network data.

In another instance, the processing may include deriving indications of average bandwidths. Bandwidth may be averaged over a period of time. A very high average bandwidth may be indicated if the average bandwidth is above a threshold. Such indications may therefore be an example of enriched network data.

For another instance, the processing may include deriving indications of video based on processing network data. For example, indications may be derived when network bandwidths (or in other word bit rates) and/or numbers of packets per second are detected as being in accordance with what may be expected for video (e.g. comparable to type(s) of bit rate (e.g. variable bit rate VBR) expected for video). Additionally or alternatively, indications may be derived based on the network transmittal protocols. Such indications may therefore be an example of enriched network data.

For another instance, the processing may include deriving similarities between tuning patterns and network transmittal patterns. Continuing with describing this instance, the tuning pattern may include the start time of tuning and the end time of tuning, while the network transmittal pattern may include the start time of transmittal and the end time of transmittal. The start time of tuning may be compared to the start time of network transmittal. The end time of tuning may be compared to the end time of network transmittal. A network transmittal pattern may be similar to a tuning pattern, for instance when a start time of transmittal begins right before, or at the same time as, the start time of tuning and/or an end time of transmittal ends soon after, or at the same time as, the end time of tuning. Such similarities may therefore be an example of enriched data comprising consumption data and network data.

For another instance, the processing may include deriving indications of filtering. Continuing with describing this instance, indications of filtering may be derived if network transmittal pauses during commercial interruptions of the content; if network transmittal beginning time and ending time correspond substantially to the body of a program, etc. For example, the body of a program may include the part of the program that is unique to the program, rather than used repeatedly (e.g. excluding theme song, credits, etc.). Considering cases where the network transmittal starts right before or at the same time as the start of the body of the program at time t1; the network transmittal pauses around the start of the commercial break at time t2; the network transmittal restarts around the end of the commercial break at time t3, and the network transmittal ends right after or at the same time as the end of the body of the program at time t4. In some of these cases, the processing may derive an indication of filtering based on the beginning, pause, and ending of the network transmittal. Such indications of filtering may therefore be an example of enriched data comprising consumption data and network data.

For another instance, the processing may include deriving suspicious destination IP address(es). Destination IP addresses may be determined to be suspicious, for example, by way of external database(s) such as MaxMind®, OpenDNS®, Web Reputation, etc. Such suspicious destination IP address(es) may therefore be an example of enriched network data.

For another instance, the processing may include deriving suspicious destination geographical locations. Corresponding geographical locations may be for destination IP address(es), for example, by way of external database(s) (e.g. MaxMind or similar). A location in a different country than the location of the subscriber system 120A which sent to the corresponding destination IP address, and/or a location in a country known for loose law enforcement, may be considered suspicious. Such suspicious destination geographical locations may therefore be an example of enriched network data.

For another instance, the processing may include deriving suspicious billing subscriber addresses. The billing address of a subscriber may be compared to the zip code of a smartcard used in subscriber system 120A of the subscriber. Additionally or alternatively, it may be checked whether billing address(es) are actual address(es) by way of map external databases (e.g. Google Maps™ or similar), yellow pages, and/or a postal website (e.g. if the billing address includes a post office box). A billing address with a zip code that does not match the zip code of the smartcard, and/or a billing address that is not an actual address may be considered suspicious. Such suspicious billing subscriber addresses may therefore be an example of enriched data indicative of characteristics of subscribers.

In some embodiments, stage 520 may be omitted, if enriched data is not required for identifying subscribers suspected of unauthorized distribution of subscribed content.

In stage 530, identifying system 170 may store received data and/or enriched data derived from processing received data. Stages 510 to 530 may be repeated when data is again received. Additionally or alternatively, stages 510 to 530 may be repeated when data is again received, regardless of whether or not stages 520 (if performed) and 530 for the previously received data have been completed.

In stage 540, identifying system 170 may detect a trigger which triggers an attempt to identify subscriber(s) suspected of unauthorized subscribed content distribution. Stage 540 may be performed in some cases independently of any of stages 510 to 530, whereas in other cases the performance of stage 540 may depend on the performance of any of stages 510 to 530, and therefore a dotted line is illustrated between any of stages 510 to 530 and stage 540

The type of trigger may vary depending on the embodiment and may include any appropriate trigger. However, for the sake of further illustration some examples are now provided, one or more of which may be applied in some embodiments.

For example, the trigger may include the receipt (in stage 510) of new data. As another example, the trigger may be time-based, for instance triggering an episodic attempt to identify subscriber(s) suspected of unauthorized distribution of subscribed content, or triggering an episodic attempt provided new data has been received since the last triggered attempt.

As another example, the trigger may include receipt of specific data in stage 510. The received specific data may vary depending on the embodiment and may include any appropriate data, but for the sake of further illustration, some instances are now provided. For instance, the specific data may include the identification of a subscriber suspected of unauthorized detection, where the subscriber was identified not by way of method 500. The receipt of such an identification may trigger an attempt at identification by way of method 500, in order to determine whether or not the attempt also identifies the same suspected subscriber. Continuing with describing this instance, content received by a plurality of subscriber systems 120 may have been accompanied by and/or may have included verification data (e.g. commands to the subscriber systems 120 to embed verification data, and/or verification data embedded in the content). Therefore verification data may have been detected and extracted from unauthorized streamed content, and an indication of the verification data may identify the subscribers that distributed the content even though unauthorized. The identification attempt by way of method 500 may result in an identification of the same suspected subscriber or not, thus increasing or decreasing the weight to the suspicion. For another instance, the specific data may additionally or alternatively include data relating to detected unauthorized distribution, such as one or more channels detected as being streamed, detected IP addresses of unauthorized streaming systems 140, etc. (e.g. detected by web-crawling system 190).

In some cases where the receipt may include specific data, the analysis to be performed may be time-sensitive and therefore it may be desirable that the trigger be applied without delay, in contrast to other triggers where delay may sometimes be acceptable. For instance, if there is reason to believe that a subscriber is currently engaging in unauthorized distribution then the analysis may be time sensitive. Continuing with this instance, the content detected as being streamed may, perhaps, be content currently or recently provided by content provider system 110, and therefore there may be reason to assume that the subscriber is currently performing unauthorized distribution of live content.

As another example, the trigger may include update(s) to processing and/or analyzing technique(s) (e.g. due to updating based on feedback). Therefore a dotted line is shown between stage 575 and/or 580 (to be described below) and stage 540. The type(s) of update(s) to processing and/or analyzing technique(s) that may act as a trigger, and/or the type(s) of feedback, may vary depending on the embodiment and may include any appropriate type(s). However for the sake of further illustration, some instances are now provided one or more of which may be applied in some embodiments. For instance, feedback may have indicated that subscriber systems 120 that received subscribed content from content provider 110 and transmitted data on communication networks 150 between 3 AM and 5 AM, were associated with subscribers that were confirmed as performing unauthorized distribution, whereas other subscriber systems 120 were not. In this instance, the processing and/or analyzing technique(s) may be updated to consider the suspect time slot (e.g. so that anomaly detection may consider subscriber data relating to the time slot on one or more given days, and/or so that a classification model may include the time slot), and the updating to the processing and/or analyzing technique(s) may trigger an attempt at identification that uses the update(s). For another instance, feedback may have indicated that unauthorized distribution of subscribed content by certain identified suspected subscribers was confirmed ("confirmed unauthorized distributors"), whereas for other identified suspected subscribers, unauthorized distribution was not confirmed ("unconfirmed unauthorized distributors"). Processing and/or analyzing technique(s) may be updated to emphasize and/or repeat processing and/or analyzing which led to identification of confirmed unauthorized distributors; and/or to deemphasize, remove and/or modify processing and/or analyzing which led to identification of unconfirmed unauthorized distributors. For example, a comparing technique used in the analysis for detecting anomalous data may be emphasized and/or repeated if such a technique led to identification of confirmed unauthorized distributors, or may be deemphasized, removed and/or modified if such a technique led to identification of unconfirmed unauthorized distributors. The updating to the processing and/or analyzing technique(s) may trigger an attempt at identification that uses the update(s). It should be noted that in some embodiments, updates to processing and/or analyzing technique(s) may not trigger an attempt at identification.

In stage 545, identifying system 170 may obtain subscriber data for the analysis that will be performed in the following stage of analyzing the obtained data 550 (to be described below). The scope and type(s) of obtained data may vary depending on the embodiment, and may include any appropriate scope and type(s). However, for the sake of further illustration some examples are now provided, one or more of which may be applied in some embodiments.

For example, obtained data may comprise at least one of: consumption data relating to subscribed content consumption by one or more subscribers, or network data relating to data transmittal via one or more computer networks by the one or more subscribers. Certain enriched data, for instance, may comprise both consumption data and network data, as may be seen from the description above of stage 520. It should be understood that in this example, obtained data may or may not also include data other than consumption data or network data. For another example, obtained data may include data that was received but not yet stored, enriched data derived from received data, retrieved data (where the retrieved data may include, for instance, received data that was stored, and/or enriched data that was stored), etc. For another example, obtained data may include data received by identifying system 170 within a limited duration of time (e.g. a limited duration before the present time, or a limited duration sometime in the past), and/or may include data received by identifying system 170 over a longer duration of time. For another example, obtained data may include data of subscribers not previously identified by identifying system 170 as being suspected of unauthorized distribution. Continuing with describing this example, obtained data may in some cases also include data of subscribers previously identified by identifying system 170 as being suspected of unauthorized distribution. For another example, the obtained data may vary depending on the analysis to be performed, and may include any appropriate data for the analysis. For another example, the obtained data may relate to a plurality of subscribers. In such an example, the plurality of subscribers may or may not include all of the subscribers of content provider system 110.

In stage 550, identifying system 170 may analyze the obtained subscriber data. The analyzing technique(s) used during stage 550 may vary depending on the embodiment, and may include any appropriate analyzing technique(s). However, for the sake of further illustration to the reader, some examples are now presented, one or more of which may be applied in some embodiments.

For example, the analyzing technique(s) may include anomaly detection (e.g. using Mahalanobis distance, clustering, etc.). Anomaly detection may include detection of anomalous data (i.e. outlier) by comparing subscriber data of different subscribers in the plurality of subscribers. For instance, anomaly detection may include comparison of a set of one or more pieces of subscriber data (e.g. any of the examples of received and/or enriched data discussed above with reference to stage 510 and/or 520) for different subscribers. If anomaly detection is performed, subscriber(s) identified as being suspected of unauthorized subscribed content distribution may be subscriber(s) that are associated with anomalous data. However, in some embodiments of this example, not necessarily all subscriber(s) associated with anomalous data may be identified as being suspected of unauthorized subscribed content distribution. In these embodiments, the analyzing technique(s) may also include other analyzing technique(s) such as statistical classification (e.g. using support vector machine, logistic regression, random forest, decision tree, etc.), Multiple Instance Learning (MIL), and/or any other analyzing technique(s), prior to identifying subscriber(s) suspected of unauthorized subscribed content distribution.

Referring to anomaly detection, it may be useful, in some cases, to compare subscriber data with reference to a particular period of time and/or program identifier, as the same or similar data of a particular subscriber may be indicative of unauthorized subscribed content distribution when relating a certain time period or program, but not indicative of unauthorized subscribed content distribution when relating to another time period or program. For example, when a program identifier and/or time period is associated with particular type(s) of program(s), such as an interactive game show where subscribers transmit pictures and/or videos in order to answer questions, a high average transmittal bandwidth may be expected from subscribers. However, during other type(s) of program(s), a high average bandwidth for a particular subscriber may deviate from the bandwidth for other subscribers.

Comparison of subscriber data in order to detect anomalous data may include, for instance, calculating Mahalanobis distances for different subscribers. A respective set of one or more pieces of subscriber data may be used such as the number of times a subscriber tuned in or out during a particular time period and/or for a particular program identifier, the number of times a subscriber raised the electronic program guide during a particular time period and/or with for a particular program identifier, the average bandwidth during a particular time period and/or for a particular program identifier, the number of times a subscriber used trick mode(s) during a particular time period and/or for a particular program identifier, bit rates during a particular time period and/or for a particular program identifier, numbers of packets per second during a particular time period and/or for a particular program identifier, etc. If more than one piece of subscriber data is used, a respective average (e.g. weighted) of one or more of the pieces of data may be computed and compared for the different subscribers, and/or each piece of data may be separately compared for the different subscribers. In some cases, the particular time period may be a current time period and/or the program identifier may be the identifier of a program currently being provided by content provider system 110 so as to detect anomalous data relating to unauthorized distribution of live subscribed content.

Figure 6A:
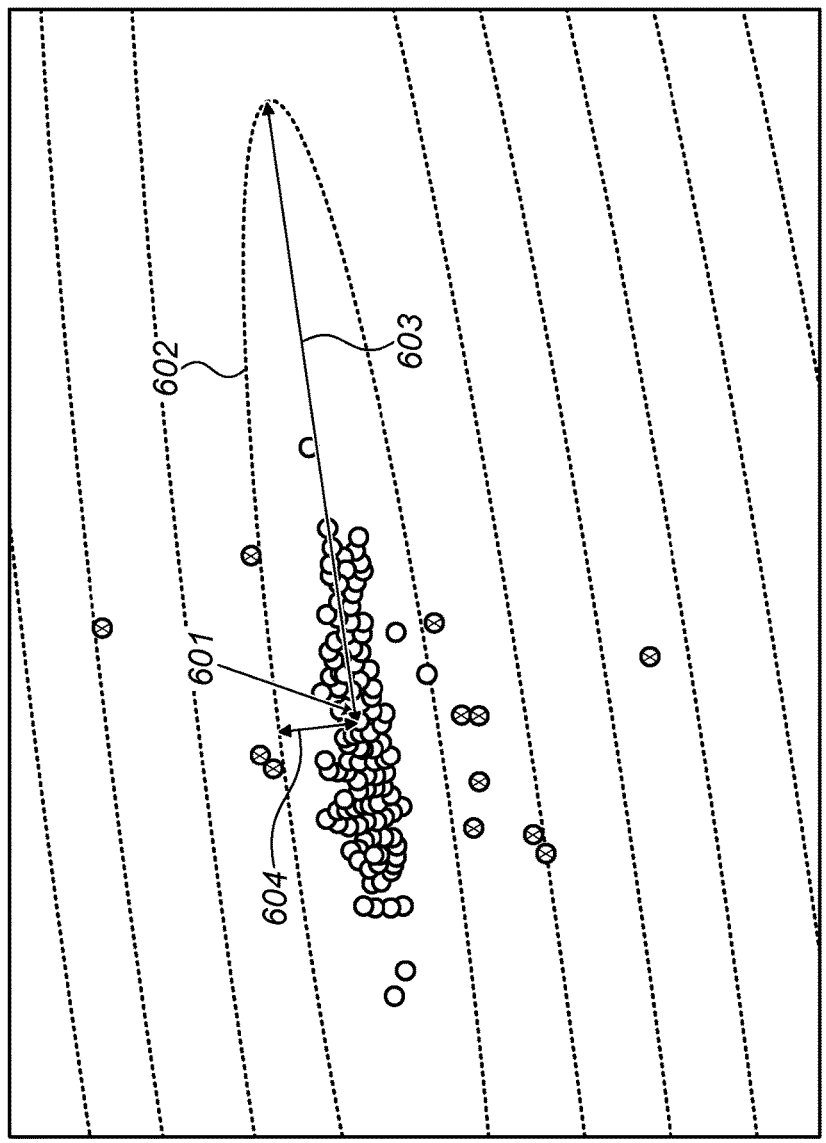
FIG. 6A illustrates a plot of Mahalanobis distances for subscriber data, in accordance with some embodiments of the presently disclosed subject matter.

Refer to FIG. 6A, which illustrates a plot 600A of Mahalanobis distances for subscriber data, in accordance with some embodiments of the presently disclosed subject matter.

The distribution of subscriber data of different subscribers is represented as a distribution of points in FIG. 6A, with mean 601. The Mahalanobis distance of any point in FIG. 6A is the distance between the point and mean 601. Ellipse 602 is shown in FIG. 6A at a horizontal distance 603 and a vertical distance 604 from mean 601. Ellipse 602 may be representative of a selected number of standard deviations from mean 601, where the selected number may vary depending on the embodiment. Data may be detected as anomalous if the data is represented by a point outside of ellipse 602. In contrast, a point inside of ellipse 602 may be representative of non-anomalous data. In plot 600A, the points outside of ellipse 602 are marked with an "x".

It is noted that points may not necessarily be plotted in order to use the Mahalanobis distances to detect anomalous data. Moreover, technique(s) to detect anomalous data may not necessarily include Mahalanobis distances and/or standard deviations. For instance, other measure(s) of variation may be used instead of or in addition to standard deviation.

It may be assumed that due to the anomaly detection, subscriber(s) that are associated with the anomalous data may be detected. Depending on the embodiment, all of such subscriber(s) may be identified as being suspected of unauthorized subscribed content distribution, or additional analysis may be performed to determine which of such subscriber(s) is to be identified as being suspected of unauthorized subscribed content distribution.

For instance, in order to determine which of the subscriber(s) associated with the anomalous data is to be identified as being suspected of unauthorized subscribed content distribution, a comparison may be made between subscriber data that relates to such subscriber(s) to obtained subscriber data relating to detected unauthorized distribution. For example certain obtained data may indicate channel(s) detected as being streamed (e.g. by web crawling system 190) and/or IP addresses of unauthorized streaming systems 140 and therefore may be considered as data relating to detected unauthorized distribution. Channel(s) allowed by conditional access and/or digital rights management for subscriber, and/or channel(s) tuned into by subscriber system 120A of the subscriber may be compared to the detected channel(s). Additionally or alternatively, destination IP addresses for subscriber system 120A may be compared to the detected IP addresses of unauthorized streaming systems 140. In some cases of this example, the channel(s) may be detected as being streamed while live content is being distributed by subscriber system 120A.

Additionally or alternatively, for instance, in order to determine which of the subscriber(s) associated with the anomalous data is be identified as being suspected of unauthorized subscribed content distribution, statistical classification may be performed. Statistical classification may include, for example, classifying subscriber data relating to such a subscriber into one of two or more categories. For example, data relating to a subscriber may be classified as being indicative of the subscriber performing unauthorized distribution of subscribed content, or may be classified as being indicative of the subscriber not performing unauthorized distribution of subscribed content. The manner in which obtained data may be so indicative may vary depending on the embodiment, and may include any appropriate manner. However for the sake of further illustration, one instance is now described. For instance, data that relates to a particular subscriber may be determined to be indicative of the subscriber performing unauthorized subscribed content distribution, based on a comparison of such data to a model developed (e.g. updated in iterations of stage 575 to be described below) by identifying system 170 based on data of confirmed unauthorized distributors of subscribed content (where subscribers may have been confirmed as unauthorized distributors by way of feedback). The compared data of the particular subscriber may be a set of one or more pieces of data (which may be the same and/or different than the set used in anomaly detection), where the pieces of data may include, for instance any of the examples of received and/or enriched data discussed above with reference to stage 510 and/or 520. The model may include expected parameters (e.g. values, ranges of values, relationships, etc.) for the set, which may be expected if the particular subscriber is performing unauthorized distribution of subscribed content. If the compared data of the subscriber corresponds to the model to an extent above a threshold, then the data of the subscriber may be classified as indicative of unauthorized subscribed content distribution. However, if the compared data does not correspond to the model or corresponds to an extent, below the threshold, then the data of the subscriber may be classified as not indicative of unauthorized subscribed content distribution.

The threshold(s) between classification categories, for example, may vary depending on the embodiment, and may include any appropriate threshold. For instance, a higher threshold may be set to classify data as indicative of a subscriber performing unauthorized subscribed content distribution, if it is desirable that there be less of a possibility of false positives, whereas a lower threshold may be set if the population of subscribers is more tolerant of false positives. For another instance, a threshold may vary depending on the type of policy. Continuing with describing this instance, the threshold may be set lower for a policy that includes a confirmation policy, than for a policy that solely includes an enforcement policy. A lower threshold for a policy that includes a confirmation policy may be acceptable as the policy may stipulate action(s) to be performed in an attempt to confirm that such a subscriber is performing unauthorized distribution.

Anomaly detection may in some cases be more relevant than statistical classification of data for a particular subscriber. For example, there may not be sufficient data regarding confirmed unauthorized distributors to develop a model. Additionally or alternatively, for example the model may not necessarily always be correct, and in this example the model may cause false positives. Continuing with this example, it may not always be possible to match the conditions (e.g. time of day, day of week, program identifier, channel identifier, characteristics of subscribers, data regarding commercial interruptions, data regarding body of program, etc.) associated with the data of the confirmed unauthorized distributors, based on which the model was developed, to the conditions associated with the data of the particular subscriber. Therefore it may not always be clear if the model is comparable to the data of the particular subscriber. It should be understood that in these cases a comparison to the model may be performed nevertheless.

Figure 6B:
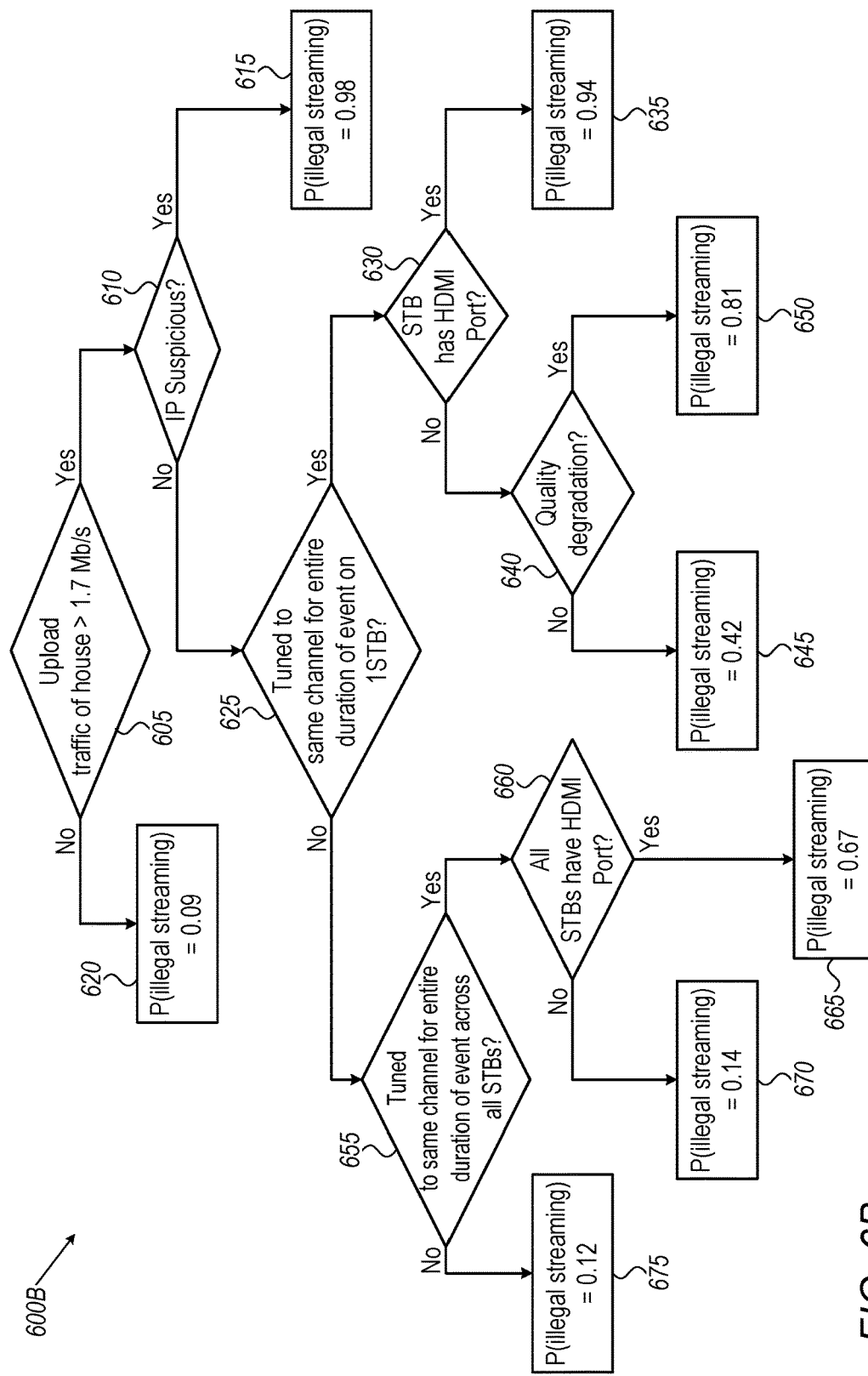
FIG. 6B illustrates a decision tree for classifying subscriber data, in accordance with some embodiments of the presently disclosed subject matter.

FIG. 6B illustrates a decision tree 600B for classifying obtained subscriber data, in accordance with some embodiments of the presently disclosed subject matter. It is assumed that there is sufficient data regarding confirmed unauthorized distributors to create a proper model as described in decision tree 600B. FIG. 6B will be described with reference to subscriber system 120A. Subscriber system 120A may be for a subscriber associated with anomalous data.

At decision tree leaf 605, identifying system 170 may determine whether or not the transmittal bandwidth of subscriber system 120A (e.g. in the house of a subscriber) is a very high bandwidth, say larger than 1.7 Mb/sec or any other appropriate value. If yes, then at decision tree leaf 610, identifying system 170 may determine whether or not subscriber system 120A is transmitting to a suspicious destination IP address, e.g. based on whether or not the processing in stage 520 derived that the destination IP address is suspicious. For example, confirmed unauthorized distributors may have had a bandwidth larger than 1.7 Mb/sec and may have transmitted to suspicious IP destination IP address(es) and therefore a relationship of larger than 1.7 Mb/sec and suspicious IP address may be included in the model. If yes, then at decision tree leaf 615, identifying system 170 may assign a probability of unauthorized distribution of, say 98%, to the subscriber of subscriber system 120A.

If at decision tree leaf 605, identifying system 170 instead determines that the transmittal traffic is not a very high bandwidth, e.g. less than or equal to 1.7 Mb/sec or any other appropriate value, then at decision tree leaf 620, identifying system 170 may assign a probability of unauthorized distribution of, say, 9% to the subscriber of subscriber system 120A.

Referring again to decision tree leaf 610, if at decision tree leaf 610, identifying system 170 instead determines that subscriber system 120A is not transmitting to a suspicious destination IP address, then at decision tree leaf 625, identifying system 170 may determine whether or not subscriber system 120A (e.g. an STB included in subscriber system 120A) is tuned to the channel for the entire duration of an event that is being transmitted on the channel as the event occurs by content provider 120.

If the subscriber system is tuned to the channel for the entire duration, then at decision tree leaf 630, identifying system 170 may determine whether or not subscriber system 120A (e.g. an STB included in subscriber system 120A) includes an HDMI port. If subscriber system 120A includes an HDMI port, then at decision tree leaf 635, identifying system 170 may assign a probability of unauthorized distribution of say 94% to the subscriber of subscriber system 120A. For example, confirmed unauthorized distributors may have had bandwidth over 1.7 Mb/sec, may have been tuned to a channel for the entire duration, and may have had an HDMI port. Therefore such parameters may be included in the model.

If at decision tree leaf 630 it is determined that subscriber system 120A excludes an HDMI port, then at decision tree leaf 640 it may be determined if there is a detected quality degradation in the streamed content, presumably due to the distributing subscriber system excluding an HDMI port. If no quality degradation is detected, then at decision tree leaf 645, identifying system 170 may assign a probability of unauthorized distribution of, say, 42% to the subscriber of subscriber system 120A. If there is quality degradation, then at decision tree leaf 650, identifying system 170 may assign a probability of unauthorized distribution of, say, 81% to the subscriber of subscriber system 120A. For example, confirmed unauthorized distributors may have had bandwidth over 1.7 Mb/sec, may have been tuned to a channel for the entire duration of the event, and may not have had an HDMI port when there is quality degradation. Therefore such parameters may be included in the model.

Referring again to decision tree leaf 625, if subscriber system 120A is not tuned to the channel for the entire duration, then at decision tree leaf 655, identifying system 170 may determine whether or not all of subscriber system(s) 120 of subscriber(s) associated with anomalous data that include STBs (or a large majority of such subscriber systems 120) are tuned to the channel for the entire duration.

If all (or a large majority) of subscriber system(s) 120 of subscriber(s) associated with anomalous data that include STBs are tuned to the channel for the entire event, identifying system 170 may determine at decision tree leaf 660 whether or not all (or a large majority) of such subscriber systems 120 have HDMI ports. If all (or a large majority) of such subscriber systems 120 have HDMI ports then at decision tree leaf 665, identifying system 170 may assign a probability of unauthorized distribution of, say, 67% to the subscriber of subscriber system 120A. For example, confirmed unauthorized distributors may have had bandwidth over 1.7 Mb/sec, may not have been tuned to a channel for the entire duration whereas other subscriber(s) may have been, and may not have had an HDMI port nor may have had the other subscribers. Therefore such parameters may be included in the model.

If all (or a larger majority) of subscriber systems 120 do not have HDMI ports then at decision tree leaf 670, identifying system 170 may assign a probability of unauthorized distribution of, say, 14% to the subscriber of subscriber system 120A.

Referring again to decision tree leaf 655, if all (or a large majority) of such subscriber systems 120 are not all tuned to the channel for the entire duration, then at the decision tree leaf 675, identifying system 170 may assign a probability of unauthorized distribution of, say, 12% to the subscriber of subscriber system 120A.

It is noted that the probabilities shown in decision tree 600B are provided for the sake of example, and that assigned probabilities may vary depending on the embodiment.

Depending on the assigned probability, obtained data relating to the subscriber of subscriber system 120A may be classified as indicative of unauthorized distribution, or may be classified as not indicative of unauthorized distribution. For example, if the subscriber is assigned a probability larger than 50%, obtained data relating to the subscriber may be classified as indicative of unauthorized distribution. If the subscriber is assigned a probability less than or equal to 50%, obtained data relating to the subscriber may be classified as not indicative of unauthorized distribution. It is noted that in this example, 50% is the threshold for the obtained data being classified as indicative of unauthorized distribution by the subscriber. However, as mentioned above the threshold may vary depending on various considerations such as the acceptable number of false positives, the type of policy, etc.

In some embodiments, decision tree 600B may be used in an analysis of whether or not data that relates to the subscriber may be classified as indicative of the subscriber performing unauthorized distribution of live subscribed content. For example, decision tree 600B may be used during the duration of the event mentioned in decision tree leaves 625 and 655.

The subject matter is not bound by decision tree 600B. In some embodiments, decision tree 600B may be modified from what is illustrated in FIG. 6B. Additionally or alternatively, in some embodiments classification analysis may include different decision tree(s) (having at least one common leaf or having no common leaves with decision tree 600B) in addition to or instead of decision tree 600B, or may exclude decision trees.

Referring again to FIG. 5, in stage 555, identifying system 170 may identify one or more suspected subscribers out of the plurality of subscribers, as being suspected of unauthorized subscribed content distribution. The suspected subscriber(s) may be associated with the anomalous data, although as stated above, not necessarily all subscribers associated with anomalous data may be identified as suspected subscribers.

The manner in which a suspected subscriber may be identified by identifying system 170 may vary depending on the embodiment, and may include any appropriate manner. However for the sake of illustration some examples are now presented, one or more of which may be applied in some embodiments.

For example, the subscriber may be identified in any suitable manner which may allow an output regarding the subscriber to be identifiable as relating to the subscriber. For another example, the subscriber may be identified in any suitable manner which may allow content provider system 110 and/or other element(s) in network 100 to perform action(s) with respect to the correct subscriber. For another example, the subscriber may be identified in any suitable manner which may allow assignment of an identifier to a formulated policy regarding the subscriber, the identifier of the policy allowing content provider system 110 and/or other element(s) in network 100 to perform action(s) with respect to the correct subscriber. In such examples, the identity of the subscriber as identified by identifying system 170 may include, for instance, a subscriber system identifier (e.g. IP address, serial number, etc.), a personal identifier (e.g. phone number, username, etc.), an internal identifier assigned for use internally within network 100, etc.

For another example, the identifying of a suspected subscriber may, in some cases include indicating a level of suspicion for the suspected subscriber. A level of suspicion for a subscriber may be absolute (e.g. a probability), or may be relative to other suspected subscribers (e.g. highest level for subscriber most suspected of unauthorized subscribed content distribution, second highest level of subscriber that is the second most suspected, etc.).

Reference is made again to FIG. 6B. In FIG. 6B, if the subscriber of subscriber system 120A was assigned a probability larger than 50% (or any other appropriate value) and therefore obtained data relating to the subscriber was classified as indicative of unauthorized distribution, the subscriber may consequently be identified as being suspected of unauthorized distribution in stage 555. If the subscriber was instead assigned a probability less than or equal to 50% (or any other appropriate value), and obtained data relating to the subscriber was classified as not indicative of unauthorized distribution, the subscriber may consequently be identified as not being suspected of unauthorized distribution in stage 555. The assigned probability may be used, for example, as an indication of the level of suspicion against the subscriber.

Additionally or alternatively, the level of suspicion that is indicated for a suspected subscriber may be lower if the analysis only included anomaly detection than if the analysis also included additional analysis technique(s) such as classification.

In some embodiments, in addition to or instead of identifying subscriber(s), identifying system 170 may identify, based on data relating to the at least one subscriber suspected of unauthorized distribution, other information, e.g. that may be useful for policy formulation. For instance, if data relating to subscriber(s) identified as being suspected of unauthorized distribution indicates that such subscriber(s) are tuned consistently to certain channels at certain times, etc.; the other information identified as useful for policy formulation may include likely channel(s) being distributed, times of distribution, etc. Additionally or alternatively, the other information may include subscriber characteristic(s). In some embodiments, such other information may not be identified.

In stage 560, identifying system 170 may provide the identity/ies of the suspected subscriber(s). The provision may vary depending on the embodiment, and may include any appropriate provision. However for the sake of illustration some examples are now presented, one or more of which may be applied in some embodiments.

For example, identifying system 170 may provide the identity/ies for policy formulation. For another example, identifying system 170 may provide the identity/ies for output from identifying system 170, where the output may be for policy formulation and/or for any other suitable purpose. Optionally, in any of these examples, the provision may also include providing level(s) of suspicion for such subscriber(s) and/or other information, e.g., that may be useful for policy formulation.

Depending on the embodiment, identifying system 170 may or may not designate subscriber(s) that are not identified as being suspected of unauthorized distribution, as not being identified as being suspected of unauthorized distribution. Identifying system 170 may or may not provide a designation of such subscriber(s), e.g. for policy formulation.

In some embodiments, stages 550 and 555 may be performed, for example, by identifying system 170 while one or more suspected subscribers may be performing unauthorized distribution of live subscribed content. In such embodiments, data relating to a particular subscriber may be detected as being anomalous and (the same and/or different) data relating to the subscriber may be classified as being indicative of unauthorized distribution of live subscribed content. Identifying system 170 may identify the subscriber, if appropriate as being suspected of unauthorized distribution of live subscribed content.

After stage 555, identifying system 170 may perform another iteration of stages 540 to 555. For example, identifying system 170 may wait for a trigger to perform another attempt to identify subscriber(s) suspected of unauthorized distribution of subscribed content. If any of stages 565 to 580 (to be described below) are to be performed, then depending on the embodiment, the trigger may arrive before stage 565 and/or stage 570, in between any of stages 565 to 580, or after stages 565 to 580.

Additionally or alternatively, if action(s) specified by any formulated policy (see FIG. 7), or part(s) thereof is/are to be performed by identifying system 170, identifying system 170 may perform such action(s), or part(s) thereof, in stage 565. For example, the specified action(s) may include a subsequent stricter analysis of the obtained data, in an attempt to confirm unauthorized subscribed content distribution by suspected subscriber(s). In this example, identifying system 170, may repeat stages 540 and 555, for one or more of the suspected subscriber(s), and use, for instance, a higher threshold between classification categories to classify obtained data relating to the subscriber(s) as indicative of unauthorized subscribed content distribution. In another instance, additionally or alternatively, the number of standard deviations selected for anomaly detection (e.g. using Mahalanobis distances) may be increased, in a repetition of stages 540 and 555. In some other embodiments where none of the action(s) specified by the policy/ies is to be performed by detection system 180, stage 565 may be omitted.

Figure 8:
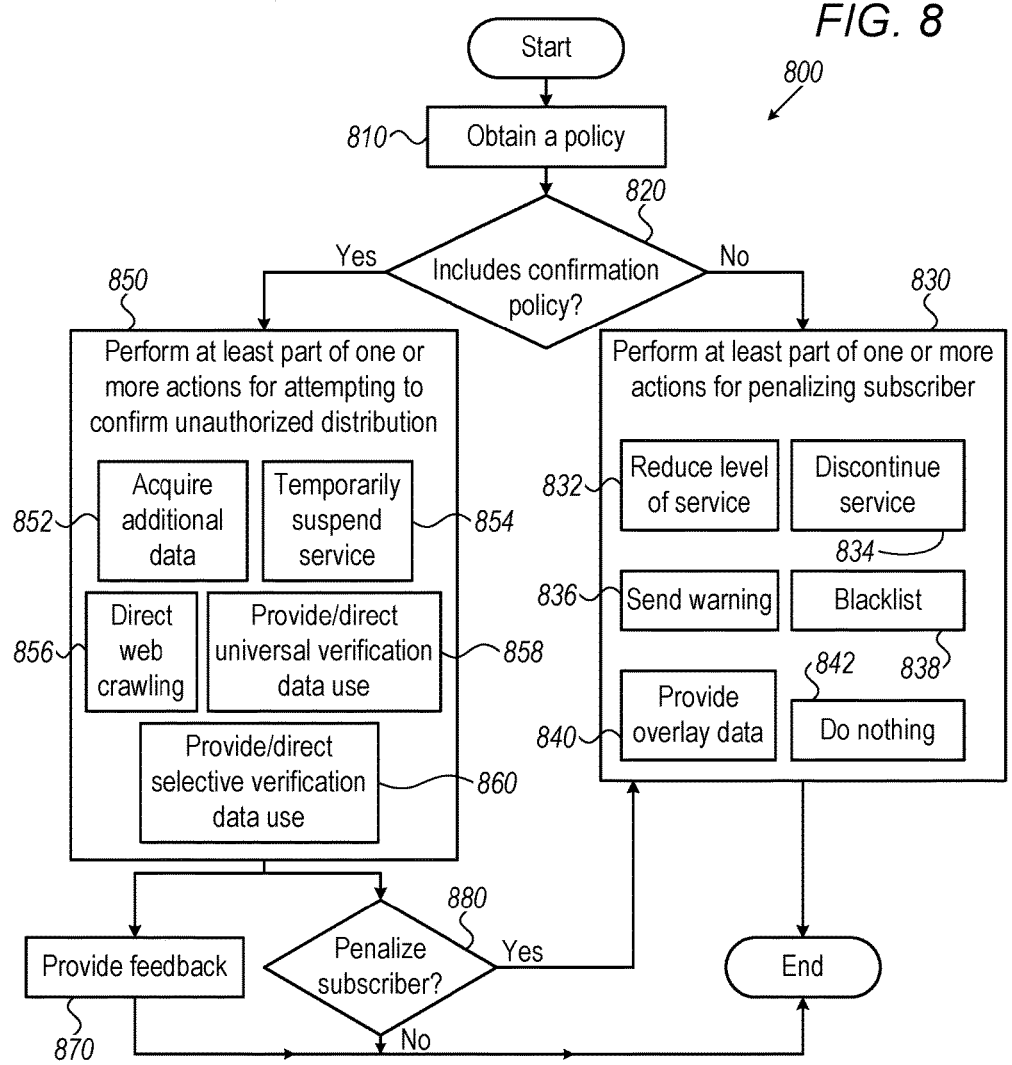
FIG. 8 is a flowchart of a method for performing action(s) or part(s) thereof specified in a policy, in accordance with some embodiments of the presently disclosed subject matter.

Additionally or alternatively, feedback may be received for the current iteration of method 500 by identifying system 170 in stage 570. The type(s) of feedback and the source(s) of feedback may vary depending on the embodiment and may include any appropriate feedback. However for the sake of further illustration, some examples are now provided, one or more of which may be applied in some embodiments. For example, identifying system 170 may obtain feedback from other element(s) of network 100 such as content provider system 110, web-crawling system 190, subscriber systems 120, computer network provider system 150, and/or verification data detection system 190 with respect to policy action(s). Feedback may be received from element(s) which performed the action(s) and/or from element(s) which did not perform the action(s). Feedback may, for example include feedback regarding at least one of the suspected subscriber(s). Identifying system 170 may obtain, for example, feedback based on performed action(s), such as resulting data, and/or feedback that is a confirmation or non-confirmation of unauthorized distribution by a suspected subscriber. Additional details and examples regarding feedback will be described in more detail with reference to method 800 (FIG. 8).

Based on received feedback, analyzing technique(s) may be updated in stage 575 and/or processing technique(s) may be updated in stage 580, in order to try to improve the accuracy in identifying subscribers suspected of unauthorized distribution of subscribed content. For example, an update in analyzing technique(s) in stage 575 may affect analyzing in subsequent iterations of stage 550 (e.g. for data obtained in a subsequent iteration of stage 545). An update in processing technique(s) in stage 580 may affect processing in subsequent iterations of stage 520. The type(s) of update(s) in processing and/or analyzing technique(s) may vary depending on the embodiment and may include any appropriate update(s). However, for the sake of illustration, an instance is now described with reference to update(s) in analyzing.

For instance, if the feedback reveals that a subscriber identified as being suspected of unauthorized subscribed content distribution is not performing unauthorized subscribed content distribution, identifying system 170 may modify the analysis that identified the subscriber system so that in subsequent attempts to identify subscribers suspected of unauthorized subscribed content distribution the analysis may differ (e.g. by obtaining different/additional data for anomaly detection and/or other analytic technique(s), by using additional/different technique(s) for anomaly detection, by using additional/different analytic technique(s) for subscribers associated with anomalous data that was detected via anomaly detection, by changing a classification model that is used for classifying data as being indicative or not indicative of a subscriber performing unauthorized subscribed content distribution, by changing the threshold for classifying data as being indicative of unauthorized distribution, by changing the number of standard deviations/other measure of variation for anomaly detection, etc.). Continuing with describing this instance, updating of comparing technique(s) in order to detect anomalous data may include any of the following: obtaining different/additional subscriber data for comparison, using additional/different techniques for anomaly detection, and/or changing the number of standard deviations/other measure of variation for anomaly detection, etc. On the other hand, if the feedback revealed that a subscriber identified as being suspected of unauthorized subscribed content distribution is confirmed as performing authorized subscribed content distribution, then identifying system 170 may repeat the analysis that identified the subscriber in subsequent attempts to detect unauthorized subscribed content distribution. After any of stages 570 to 580, identifying system 170 may wait for a trigger to perform another iteration in stage 540. In some cases, the update(s) to processing and/or analyzing technique(s) may be a trigger to another iteration in stage 540.

In some embodiments, feedback may not be received in stage 570 of the current iteration of method 500 and stage 570 may therefore be omitted. In some embodiments, updating may not be performed in the current iteration of method 500 and therefore stages 575 and 580 may be omitted. For example, updating may not be performed if there is no feedback, or because updating may only be performed after a certain amount of feedback has been obtained.

Figure 7:
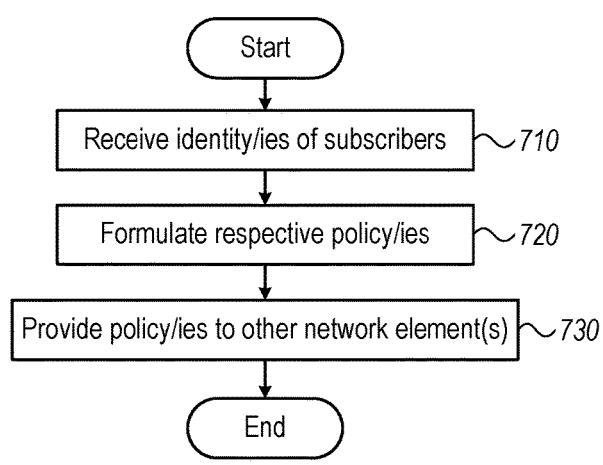
FIG. 7 is a flowchart of a method of formulating a policy, in accordance with some embodiments of the presently disclosed subject matter.

FIG. 7 is a flowchart of a method 700 of formulating a policy, in accordance with some embodiments of the presently disclosed subject matter. Method 700 may be performed, for instance, by policy system 180. Although as mentioned above, policy system 180 may in some embodiments be integrated with identifying system 170 content provider system 110 and/or other element(s) in network 100, for simplicity's sake, method 700 will be described with reference to embodiments where policy system 180 is not so integrated and performs method 700. In embodiments with integration, a similar method may be performed, mutatis mutandis.

In stage 710, policy system 180 may be provided by identifying system 170 with the identity/ies of subscriber(s) suspected of unauthorized distribution of subscribed content. Optionally, policy system 180 may be provided by identifying system 170 with a respective indication of the level of suspicion for each suspected subscriber. Optionally policy system 180 may additionally or alternatively be provided by identifying system 170 with other information such as likely channel(s) being distributed, times of distribution, etc.

In stage 720, policy system 180 may formulate a respective policy for at least one of the suspected subscriber(s). Continuing with describing this instance, it is noted, that for simplicity's sake, the description refers to a respective policy per subscriber for which a policy is being formulated, but it should be understood that in some embodiments a plurality of respective policies may be consolidated. It should also be understood that in some cases, a respective policy may not be formulated for every suspected subscriber, e.g. for implementation reasons.

A policy may vary in form and substance depending on the embodiment, and may be of any appropriate form and substance. For instance, a policy for suspected subscriber may include a confirmation policy and/or an enforcement policy. In some cases, the policy may include only an enforcement policy, only if the level of suspicion was sufficiently high to be substantially conclusive and/or the subscriber was identified also by way of other procedures (such as by way of verification data). In some cases, the policy may include only a confirmation policy, whereby if the subscriber is confirmed in accordance with the policy, no enforcement is specified by the policy. In some other cases the policy may include both a confirmation policy and an enforcement policy, whereby if the subscriber is confirmed in accordance with the confirmation policy, the subscriber may be penalized in accordance with the enforcement policy. Continuing with describing this instance, a formulated policy for a first subscriber may include a confirmation policy (and possibly also an enforcement policy), but a formulated policy for a second subscriber, having a higher indicated level of suspicion than the first subscriber may include only an enforcement policy.

The action(s) included in the policy may vary depending on the embodiment, and may include any appropriate action. However for the sake of further illustration some examples are now provided, one or more of which may be applied in some embodiments. For example, the action(s) included in a policy may include action(s) to be performed by content provider system 110, identifying system 170, and/or other elements of network 100 (such as web crawling system 190 and/or verification data detection system 195). For another example, the action(s) included in a policy may include action(s) to be performed for attempting to confirm unauthorized distribution by the suspected subscriber and/or for penalizing the suspected subscriber.

For another example, if identifying system 170 provided to policy system 180 other information such as likely channel(s) being distributed, times of distribution, etc.; the action(s) included in the policy may take into account such information (e.g. focusing on the likely channel(s) and/or time(s) of unauthorized distribution).

For another example, if there is more than one subscriber for which a policy is being formulated, the actions in the policies for any two of the subscribers for which a policy is being formulated may be the same or different. The manner in which the actions may differ and the reason that the actions may differ may vary depending on the embodiment, and may include any appropriate manner and reason. However for the sake of further illustration, some instances are now described, one or more of which may apply in some embodiments. For instance, actions in policies may vary depending on the levels of suspicion against the subscribers, e.g. confirming action(s) versus penalizing action(s), different confirming action(s) and/or different penalizing action(s). For another instance, a policy which includes only an enforcement policy may specify less strict penalizing actions for a subscriber because there may be a certain degree of uncertainty regarding whether or not the subscriber performed unauthorized distribution, compared to a policy which includes both a confirmation policy and an enforcement policy and specifies strict penalizing actions if unauthorized distribution is confirmed for the subscriber. For another instance, the actions may vary depending on characteristics of subscribers such as subscriber location (e.g. based on zip codes in smart cards, billing addresses), and/or depending on whether or not the subscriber is a repeat offender. Continuing with describing this instance, it may be possible that certain actions may not be implementable for certain subscribers (e.g. in certain subscriber locations), e.g. because of legal and/or technical restrictions. Such subscriber characteristics may have been provided as other information to policy system 180 by identifying system 170. Additionally or alternatively, it is possible that for a first offender, the policy may specify that nothing is to be done to penalize the subscriber.

In some embodiments, for each of at least one identified subscriber for which a respective policy is formulated, the respective policy may include a confirmation policy and/or an enforcement policy. Examples of action(s) that may be included in an enforcement policy may include: reduction of level of service to the subscriber, discontinuation of service to the subscriber, doing nothing to penalize the subscriber, sending of a warning to the subscriber, blacklisting at least part of a subscriber system of the subscriber, and/or use of overlay data overlaid on and/or accompanying subscribed content sent to the subscriber. Examples of action(s) that may be included in a confirmation policy may include: temporary suspension of service to the subscriber, acquisition of additional data regarding the subscriber, application of verification data to subscribed content sent to the subscriber, subsequent stricter analysis of subscriber data of the subscriber, and/or web crawling for detecting web site(s) associated with unauthorized subscribed content streaming. Possibly, there may be policies for other subscriber(s) that do not include such action(s).

In stage 730, policy system 180 may provide formulated policy/ies to element(s) in network 100 for performance of the action(s) included in the policy/ies. For example, any formulated policy may be provided to content provider system 110 and optionally to identifying system 170, depending on whether or not identifying system 170 is to perform, at least in part, any of the action(s) included in the policy. Policy/ies may or may not be provided by policy system 180 to element(s) of network 100 (e.g. computer network service provider system 155, web crawling system 190, verification data detection system 195, etc.) other than content provider system 110 and optionally identifying system 170. For example, if the other element(s) of network 100 may not be performing action(s), and/or if the other element(s) may be directed in action(s) by content provider system 110, then policy/ies may not need to also be provided to such other element(s).

Depending on the embodiment, policy system 180 may or may not perform method 700 at the same time for all policy/ies to be formulated for suspected subscribers. Depending on the embodiment, policy system 180 may or may not formulate policy/ies for subscribers designated by identifying system 170 as not being suspected of unauthorized subscribed content distribution. For example, such designated subscribers may be associated with default policies of taking no action to attempt to confirm and/or penalize the subscribers, and optionally such policies may or may not be provided by policy system 180 to element(s) of network 100. For simplicity's sake, it is assumed herein that policies are not provided for such designated subscribers to element(s) of network 100.

FIG. 8 is a flowchart of a method 800 for performing action(s) or part(s) thereof specified in a policy for a subscriber, in accordance with some embodiments of the presently disclosed subject matter.

Method 800 may be performed by content provider system 110 for a suspected subscriber. Method 800 is described, for simplicity's sake, with respect to a single suspected subscriber, but in some embodiments method 800 may be performed at the same time for a plurality of suspected subscribers, in accordance with the policies for the subscribers. Method 800 is described, for simplicity's sake, with the assumption that content provider system 110 is not integrated with any of policy system 170, identifying system 170, computer network provider system 155, web crawling system 190, or verification data detection system 195. However, in some embodiments, content provider system 110 may be integrated with one or more other element(s) in network 100 (e.g. with any of policy system 170, identifying system 170, computer network provider system 155, web crawling system 190, and/or verification data detection system 195), and a similar method may be performed, mutatis mutandis.

In stage 810, content provider system 110 may obtain a policy for a suspected subscriber, for example, from policy server 180.

In stage 820, content provider system 110 may determine if the policy includes a confirmation policy or not. If not, then in stage 830, content provider system 110 may perform at least part of one or more actions stipulated in the enforcement policy to penalize the subscriber. If yes, then in stage 850, content provider system 110 may perform at least part of one or more actions stipulated in the confirmation policy for attempting to confirm unauthorized subscribed content distribution by the subscriber. It is noted that not all of the action(s) stipulated in the policy may be performed, at least in part, by content provider system 110. For example one or more of the action(s) may be performed solely by other element(s) of network 100.

Action(s) that may be performed, at least in part, by content provider system 110 in stage 830 in order to penalize the subscriber may vary depending on the policy. However for the sake of further illustration some examples are now provided, one or more of which may be performed in some embodiments.

For example, content provider system 110 may reduce the level of service to the subscriber (832) indefinitely, as a penalizing action. In some cases, content provider system 110 may reduce the level of service by reducing the number of channels provided to the subscriber. For instance, if the subscriber was identified as being suspected of distributing content from a particular channel, content provider system 110 may stop providing the channel to the subscriber. In another instance, content provider system 110 may additionally or alternatively stop providing premium channels to the subscriber.

In another example, content provider system 110 may discontinue service to the subscriber indefinitely (834) as a penalizing action.

In another example, content provider system 110 may send to the subscriber a warning (836), e.g. by email or short message service (SMS), as a penalizing action. For instance, the subscriber may be warned of the suspicion that the subscriber is performing unauthorized distribution of subscribed content, and that further penalizing action(s) will be applied if the subscriber continues to distribute subscribed content.

In another example, content provider system 110 may blacklist (838) at least part of the subscriber system (e.g. subscriber system 120A) associated with the subscriber, as a penalizing action. The blacklisted part may be the part of the subscriber system that may be adapted to be used in unauthorized subscribed content distribution due to the configuration of the part (e.g. due to the included port(s)). For instance, a set top box associated with the subscriber having an HDMI port may be blacklisted, while a tablet device associated with the subscriber may still be able to receive subscribed content from content provider system 110.

In another example, content provider system 110 may perform at least part of a penalizing action regarding use of overlay data overlaid on and/or accompanying subscribed content sent to the subscriber (840). Content provider system 110 may provide overlay data to the subscriber, by providing overlay data overlaid on content, and/or by providing content accompanied by overlay data (e.g. a command to subscriber system 120A of the subscriber that overlay data is to be overlaid on the content). The overlay data, when presented overlaid on the content, may reduce the enjoyment of the content by the subscriber. In some embodiments, the overlay data that is overlaid on the content may include wording regarding the problematic nature of unsubscribed content distribution, but in other embodiments the overlay data may additionally or alternatively include other appropriate data.

In another example, content provider system 110, may do nothing (842) as a penalizing action. The reason for doing nothing may include any appropriate reason, such as a first offense, etc.

Once stage 830 is performed, method 800 ends.

Action(s) that may be performed, at least in part, by content provider system 110 in stage 850 in order to attempt to confirm unauthorized subscribed content distribution by the subscriber may vary depending on the policy. However for the sake of further illustration some examples are now provided, one or more of which may be performed in some embodiments.

For example, content provider system 110 may acquire additional data regarding the subscriber (852). The frequency of gathering data, and/or the type of data that is gathered, for example, may be increased. Such data may be used to confirm or not confirm unauthorized subscribed content distribution by the subscriber. Consequently content provider system 110 may provide feedback in stage 870 regarding the confirmation/non-confirmation to identifying system 170.

For another example, content provider system 110 may temporarily suspend complete or partial service to the subscriber (854). Regarding partial suspension of service, content provider system 110 may partially suspend service by e.g. reducing the number of channels provided to the subscriber temporarily. For instance, if the subscriber was identified as being suspected of distributing content from a particular channel, content provider system 110 may stop providing the channel to the subscriber temporarily. In another instance, content provider system 110 may additionally or alternatively stop providing premium channels to the subscriber, temporarily.

In such an example, content provider system 110 may determine if subsequent to the complete or partial suspension of service, if and how the subscriber complained. Based on if and how the subscriber complained, content provider system 110 may confirm or not confirm that the subscriber performed unauthorized subscribed content distribution. Dependent on confirmation or non-confirmation, content provider system 110 may or may not restore the previous level of service. In some cases, non-restoration of the previous level of service may be implemented by content provider system 110 performing stage 830, including lowering the level of service indefinitely (832) or stopping the provision of service indefinitely (834). Content provider system 110 may provide feedback in stage 870 regarding the confirmation/non-confirmation to identifying system 170.

In such an example, additionally or alternatively, network data from subscriber system 120A associated with the subscriber and/or from computer network provider system 155 may be indicative of whether or not the times of network transmittal decreased on account of the suspension of service. Such network data may be provided as feedback to identifying system 170 (the network data being an example of data resulting from an action that is feedback to system 170), or such network data may be provided to content provider system 110. If such network data is provided to content provider system 110, content provider system 110 may confirm that the subscriber performed unauthorized subscribed content distribution if the times decreased, or may not confirm that the subscriber performed unauthorized subscribed content distribution if the times did not decrease. Content provider system 110 may then provide feedback in stage 870 regarding the confirmation/non-confirmation to identifying system 170.

For another example, the action of web-crawling for detecting web site(s) associated with unauthorized subscribed content streaming may be specified by the confirmation policy. Content provider system 110 may perform part of the action by directing web-crawling (856), e.g. directing web-crawling system 190 to operate in order to confirm unauthorized subscribed content distribution. For instance content provider system 110 may completely or partially suspend service (854) by not providing particular content to an identified subscriber, one by one. Web crawling system 190 may determine if subsequent to complete or partial suspension of service, one or more unauthorized streaming systems 140 has stopped streaming. One or more unauthorized streaming systems 140 shutting down when service to a certain subscriber is completely or partially suspended, may provide confirmation that the subscriber that is currently not receiving the particular content is performing unauthorized subscribed content distribution. Feedback regarding the confirmation/non-confirmation for various subscribers may be provided to identifying system 170. For instance, web crawling system 190 may provide an indication of the shut down or non-shut down to content provider system 110 which in turn may provide the corresponding confirmation/non-confirmation feedback to identifying system 170, Additionally or alternatively, web crawling system 190 may provide the indication of shut down/non-shut down as confirmation/non-confirmation feedback to identifying system 170.

For another example, the policy may include the action of application of verification data to subscribed content sent to the subscriber. The verification data may be applied to subscribed content, e.g., by providing the verification data embedded in content, and/or by providing verification data (e.g. commands to embed verification data) accompanying the content sent to the subscriber.

Verification data may be applied, for instance, for the plurality of subscribers for which data was obtained in stage 545 of method 500. In this instance, content provider system 110 may perform part of the action by providing verification data and directing detection of the verification data (858). In some cases of this instance, the verification data may be universally applied to all subscribers of subscribed content provided by content provider system 110, as the plurality of subscribers may include all the subscribers.

Verification data may be applied, for another instance, selectively. Selective application may include the application of verification data for only a subset of the subscribers to subscribed content of content provider system 110. The subset, in some cases, may include part or all of the suspected subscriber(s). Content provider system 110 may perform part of the action by providing verification data selectively and directing detection of the verification data (860).

In either of the latter two examples regarding directing detection of verification data, content provider system 110 may direct verification data detection system 195 to attempt to detect verification data in order to confirm unauthorized distribution. Verification data detection system 195 may detect or may not detect verification data associated with the subscriber in content streamed by unauthorized streaming system 140A (where unauthorized streaming system 140A may have been identified by web crawling system 190, before or after the obtaining of the policy). Verification data detection system 195 may provide feedback to identifying system 170 regarding an indication of verification data that was detected, if any, thereby providing confirmation/non-confirmation feedback regarding unauthorized subscribed content distribution by the subscriber. Additionally or alternatively, verification data detection system 195 may provide an indication to content provider system 110 of verification data that was detected, if any, and content provider system 110 in turn may provide feedback in stage 870 to identifying system 170 confirming or not confirming that the subscriber is performing unauthorized subscribed content distribution.

In some cases, identifying system 170 may have provided other information to policy system 180 such as likely channel(s) being distributed, times of distribution, etc. In such cases, the policy for the subscriber may indicate action(s), at least one of which may take into account such information. Consequently, action(s) such as web-crawling, verification data use, and/or verification data detection may be tailored. For example, the verification data may be used for likely channel(s) at likely time(s) of unauthorized subscribed content distribution, and content provider system 110 may direct the web-crawling and verification data detection to search for and detect such channel(s) at such time(s).

Depending on the action(s) performed at least in part by content provider system 110, content provider system 110 may or may not provide feedback to identifying system 170, in stage 870. The feedback may include feedback regarding the subscriber, such as whether or not unauthorized subscribed content distribution is confirmed for the subscriber. For example, feedback may be provided by content provider system 110 in some cases, after performance of at least part of an action or actions relating to a confirmation policy. However, in other cases, feedback may not be provided, e.g. because another element of network 100 may be providing the feedback, or because an attempt at confirmation is not attempted due to the policy only including an enforcement policy.

In stage 880, content provider system 110 may determine whether or not the unauthorized distribution by the subscriber was confirmed in stage 850. If confirmed, content provider system 110 may determine whether or not the policy also includes an enforcement policy to penalize the subscriber in such as case. If unauthorized distribution was confirmed for the subscriber and the policy for the subscriber includes an enforcement policy, then subsequent to stage 880 stage 830 may be performed, as described above.

If the unauthorized distribution was not confirmed for the subscriber and/or the policy excludes an enforcement policy, then method 800 may instead end after stage 880.

In the above description of example embodiments, numerous specific details are set forth in order to provide a thorough understanding of the subject matter. However, it will be understood by those skilled in the art that some examples of the subject matter may be practiced without these specific details. In other instances, well-known features have not been described in detail so as not to obscure the subject matter.

Usage of the terms "normally", "typically although not necessarily", "although not necessarily so", "although not necessarily", "not necessarily the case", "not necessarily", "such as", "e.g.", "possibly", "it is possible", "optionally", "perhaps", "say", "one embodiment", "embodiments", "an embodiment", "some embodiments", "certain embodiments", "example embodiments", "various embodiments", "other embodiments", "some other embodiments", "another embodiment", "for example" "one example", "an example" "some examples", "examples", "another example", "various examples", "other examples", "for instance", "an instance", "one instance", "some instances", "another instance", "other instances", "various instances" "one case", "cases", "some cases", "another case", "other cases", "various cases", or variants thereof should be construed as meaning that a particular described feature is included in at least one non-limiting embodiment of the subject matter, but not necessarily in all embodiments. The appearance of the same term does not necessarily refer to the same embodiment(s).

Usage of conditional language, such as "may", "can", "could", or variants thereof should be construed as conveying that one or more embodiments of the subject matter may include, while one or more other embodiments of the subject matter may not necessarily include, a particular described feature. Thus such conditional language is not generally intended to imply that a particular described feature is necessarily included in all embodiments of the subject matter. Non-usage of conditional language does not necessarily imply that a particular described feature is necessarily included in all embodiments of the subject matter.

As used herein terms such as "assigning", "matching", "developing", "using", "obtaining", "acquiring", "selecting", "providing", "identifying", "formulating", "attempting", "causing", "indicating", "confirming", embedding", "adding", "reducing", "lowering", "stopping", "ceasing", "suspending", "determining", "generating", "changing", "feeding back", "receiving", "transmitting", "sending", "streaming", "distributing", "preparing", "transferring", "retrieving", "storing", "detecting", "sensing", "omitting", "comparing", "contrasting", "crawling", "directing" "performing", "checking", "applying", "updating", "implementing", "analyzing", "processing", "configuring", "defining", "delivering", "executing", "communicating", "enabling", "allowing", or the like should be construed in some embodiments as referring to the operation(s) of any element or elements of network 100. Operation(s) attributed to an element of network 100 herein should not be considered binding and in some embodiments, other element(s) in network 100 may additionally or alternatively perform such operation(s).

In some embodiments, stage(s) shown in any of FIG. 5, 7 or 8 respectively may be performed in a different order. Additionally or alternatively, stage(s) which are shown as being performed simultaneously may in some embodiments be performed consecutively and/or stages which are shown as being performed consecutively may in some embodiments be performed simultaneously. Additionally or alternatively, in some embodiments, any of methods 500, 700 or 800 may include fewer, more and/or different stages than illustrated in FIG. 5, 7 or 8, respectively.

In some embodiments, any of content provider system 110, policy system 180, or identifying system 170 may include fewer, more and/or different functional modules than illustrated in FIG. 2, 3, or 4, respectively. In some embodiments, the functionality of any two or more functional modules illustrated in any of FIG. 2, 3, or 4 respectively, or any part(s) thereof, may be combined in one functional module, and/or the functionality of any one functional module illustrated in any one of FIG. 2, 3, or 4, respectively may be divided among two or more functional modules.

It will be appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present subject matter.

It will be appreciated that the subject matter contemplates, for example, a computer program product comprising a computer readable medium having computer readable program code embodied therein for executing one or more methods and/or one or more parts of method(s) disclosed herein. Further contemplated, for example, are computer readable program code for executing method(s) and/or part(s) of method(s) disclosed herein; and/or a computer readable medium having computer readable program code embodied therein for executing method(s) and/or part(s) of method(s) disclosed herein. Such program code may be written in any appropriate language(s). The duration that the program code may remain embodied in the computer readable medium, may vary depending on the embodiment, for example depending on the type of program code, type of medium, type of element reading the program code, etc., and therefore is not limited herein. The location of a computer readable medium embodying program code relative to any element which reads the program code may vary depending on the embodiment and may include any appropriate location. A computer readable medium embodying program code may be any suitable storage medium (e.g. volatile, non-volatile, for long term storage, for short term storage, optical, magnetic, electronic, etc.), and/or may be any suitable medium for transferring the program code to and/or from any of the elements in network(s) 100.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method performed by a system that includes at least one processor, the method comprising:
   obtaining subscriber data of a plurality of subscribers, wherein said subscriber data comprises at least one of: consumption data relating to subscribed content consumption by said plurality of subscribers, or network data relating to data transmittal via one or more computer networks by the plurality of subscribers, wherein said subscriber data comprises a number of times a subscriber tuned in or out during a particular time period and/or for a particular program identifier and a number of times the subscriber raised an electronic program guide during a particular time period and/or with for a program identifier;

detecting anomalous data by comparing subscriber data of different subscribers in the plurality of subscribers;

identifying one or more suspected subscribers out of the plurality of subscribers as being suspected of unauthorized subscribed content distribution, the one of more suspected subscribers being associated with the anomalous data; and providing a respective identity for the one or more suspected subscribers.

2. The method of claim 1, further comprising: formulating a respective policy for at least one of the one or more suspected subscribers, wherein a respective policy for a suspected subscriber includes at least one of a confirmation policy for attempting to confirm unauthorized subscribed content distribution by the suspected subscriber, or an enforcement policy for penalizing the suspected subscriber.

3. The method of claim 2, wherein a respective policy for a suspected subscriber specifies verification data applied to subscribed content sent to the suspected subscriber.

4. The method of claim 2, wherein the confirmation policy includes at least one action selected from a group comprising: temporary suspension of service to the suspected subscriber, acquisition of additional data regarding the suspected subscriber, subsequent stricter analysis of the subscriber data of the suspected subscriber, or web crawling for detecting one or more web sites associated with unauthorized subscribed content streaming.

5. The method of claim 2, wherein said enforcement policy includes at least one action selected from a group comprising: reduction in level of service to the suspected subscriber, discontinuation of service to the suspected subscriber, sending of a warning to the suspected subscriber, blacklisting of at least part of a subscriber system of the suspected subscriber, or use of overlay data overlaid on or accompanying subscribed content sent to the suspected subscriber.

6. The method of claim 2, further comprising: performing at least one action or a part thereof, specified in the respective policy.

7. The method of claim 1, further comprising: receiving feedback regarding at least one of the one or more suspected subscribers.

8. The method of claim 7, further comprising: updating at least one comparing technique based on the feedback; and applying the at least one updated comparing technique when comparing subsequently obtained subscriber data.

9. The method of claim 1, wherein said subscriber data further comprises at least one of: data indicative of characteristics of the plurality of subscribers, data regarding available content, or data relating to unauthorized subscribed content distribution that was detected.

10. The method of claim 1, wherein said subscriber data comprises enriched data including at least one of: a tuning pattern, a correspondence between consumption and specific subscribed content, a steady computer network transmittal pattern, an average bandwidth, an indication of filtering, an indication of video, a similarity between tuning pattern and computer network transmittal pattern, a suspicious destination IP address, a suspicious destination geographical location, or a suspicious subscriber billing address.

11. The method of claim 1, wherein said identifying includes indicating a respective level of suspicion for the one or more suspected subscribers.

12. The method of claim 1, wherein the identifying identifies at least one of the one or more suspected subscribers while the at least one suspected subscriber is performing unauthorized distribution of live subscribed content.

13. The method of claim 1, further comprising: applying statistical classification to classify the subscriber data of various subscribers associated with anomalous data as indicative of or not indicative of unauthorized subscribed content distribution.

14. The method of claim 1, further comprising: detecting a trigger for attempting to identify the one or more suspected subscribers, and subsequently performing the obtaining, detecting, identifying, and providing.

15. A system comprising at least one processor, the at least one processor configured to:

obtain subscriber data of a plurality of subscribers, wherein said subscriber data comprises at least one of: consumption data relating to subscribed content consumption by said plurality of subscribers, or network data relating to data transmittal via one or more computer networks by the plurality of subscribers, wherein said subscriber data comprises a number of times a subscriber tuned in or out during a particular time period and/or for a particular program identifier and a number of times the subscriber raised an electronic program guide during a particular time period and/or with for a program identifier;

detect anomalous data by comparing subscriber data of different subscribers in the plurality of subscribers;

identify one or more suspected subscribers out of the plurality of subscribers as being suspected of unauthorized content distribution, the one of more suspected subscribers being associated with the anomalous data; and provide a respective identity for the one or more suspected subscribers.

16. The system of claim 15, the at least one processor further configured to:

formulate a respective policy for at least one of the one or more suspected subscribers, a respective policy for a suspected subscriber including at least one of: a confirmation policy for attempting to confirm unauthorized subscribed content distribution by the suspected subscriber, or an enforcement policy for penalizing the suspected subscriber.

17. The system of claim 16, wherein said at least one processor is configured to identify at least two suspected subscribers and is further configured to indicate a respective level of suspicion for the at least two suspected subscribers, and wherein a formulated policy for a first suspected subscriber out of the at least two suspected subscribers includes a confirmation policy, but a formulated policy for a second suspected subscriber out of the at least two suspected subscribers, having a higher indicated level of suspicion than the first suspected subscriber, includes only an enforcement policy.

* * * * *